United States Patent [19]
Hosoi et al.

[11] Patent Number: 6,125,716
[45] Date of Patent: Oct. 3, 2000

[54] STEERING WHEEL

[75] Inventors: Akio Hosoi, Komaki; Atsushi Nagata, Inazawa; Katsunobu Sakane, Ichinomiya, all of Japan

[73] Assignee: Toyoda Gosei Co., Ltd., Aichi-ken, Japan

[21] Appl. No.: 08/948,232

[22] Filed: Oct. 15, 1997

Related U.S. Application Data

[63] Continuation-in-part of application No. 08/768,927, Dec. 18, 1996.

[30] Foreign Application Priority Data

| Dec. 21, 1995 | [JP] | Japan | 7-333737 |
| Feb. 20, 1996 | [JP] | Japan | 8-032321 |
| Feb. 20, 1996 | [JP] | Japan | 8-032322 |
| Feb. 20, 1996 | [JP] | Japan | 8-032323 |
| Feb. 20, 1996 | [JP] | Japan | 8-032324 |
| Sep. 24, 1996 | [JP] | Japan | 8-251914 |
| Oct. 16, 1996 | [JP] | Japan | 8-273482 |

[51] Int. Cl.$^7$ .................................................. B60R 21/16
[52] U.S. Cl. ................................. 74/552; 280/731
[58] Field of Search ........................ 74/552; 280/731; 411/546

[56] References Cited

U.S. PATENT DOCUMENTS

| 3,827,715 | 8/1974 | Lynch | 280/731 |
| 5,356,173 | 10/1994 | Hongou et al. | 280/731 |
| 5,383,682 | 1/1995 | Nagata et al. | 280/731 |
| 5,584,503 | 12/1996 | Lutz | 280/731 |
| 5,647,610 | 7/1997 | Nagata | 280/731 |
| 5,765,865 | 6/1998 | Nagata et al. | 280/731 |
| 5,768,948 | 6/1998 | Hosoi et al. | 74/552 |

FOREIGN PATENT DOCUMENTS

| 48303 | 3/1983 | European Pat. Off. | 301/65 |
| 648661 A1 | 4/1995 | European Pat. Off. . | |
| 1236353 | 6/1971 | United Kingdom | 301/65 |

*Primary Examiner*—David Fenstermacher
*Assistant Examiner*—William C Joyce
*Attorney, Agent, or Firm*—Pillsbury Madison & Sutro LLP

[57] ABSTRACT

A steering wheel mounted on a steering shaft with a boss plate. The steering wheel has a gripping ring for manually turning a steering shaft. The steering wheel includes a metal ring core embedded in the gripping ring and connecting pieces formed integrally with the boss plate. Spoke cores extend between the ring core and the connecting pieces and each has a first end coupled to the ring core and a second end overlapping one of the connecting pieces. A fastener fastens together the spoke cores and connecting pieces at the second end of each spoke core.

4 Claims, 32 Drawing Sheets

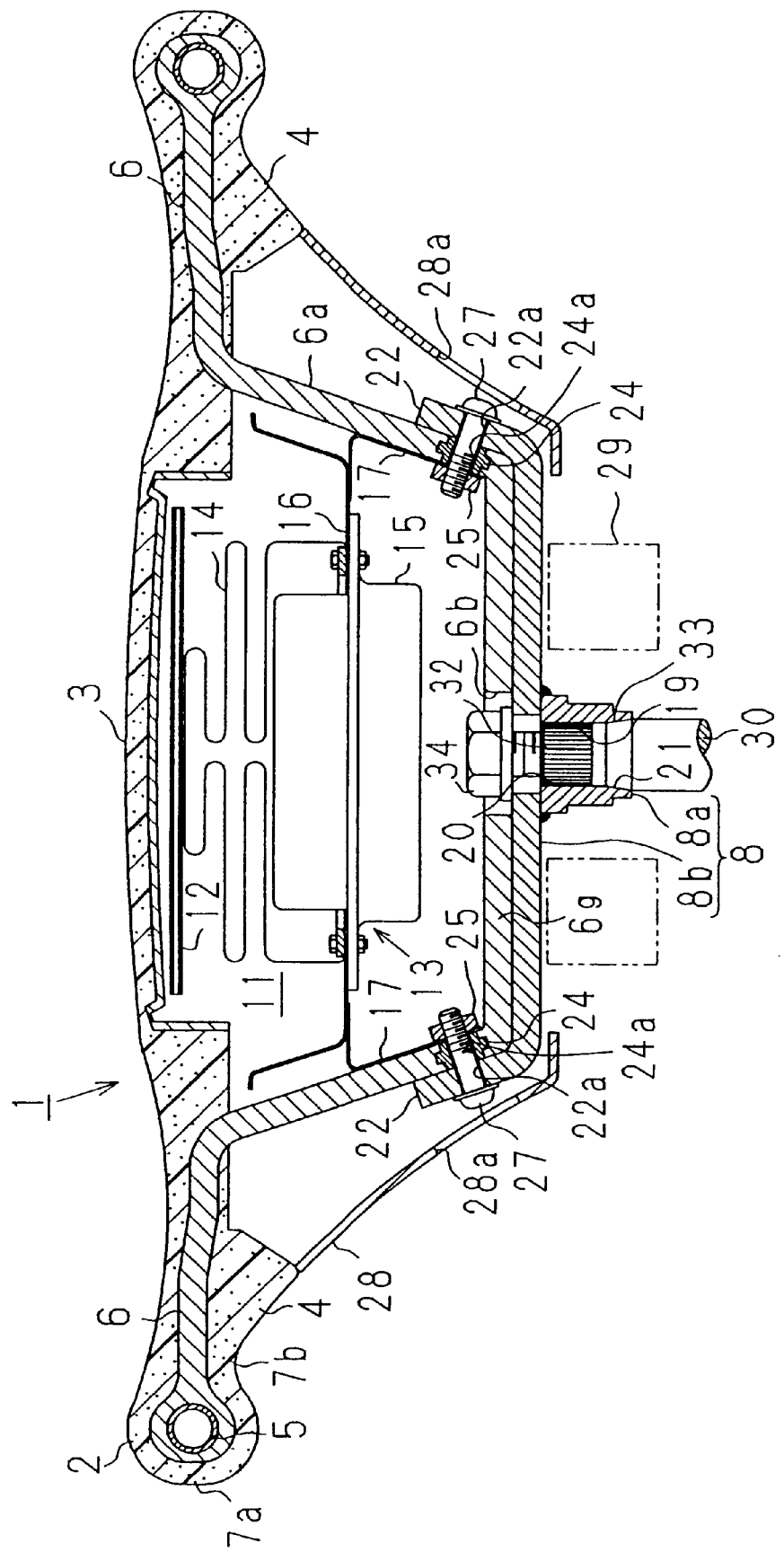

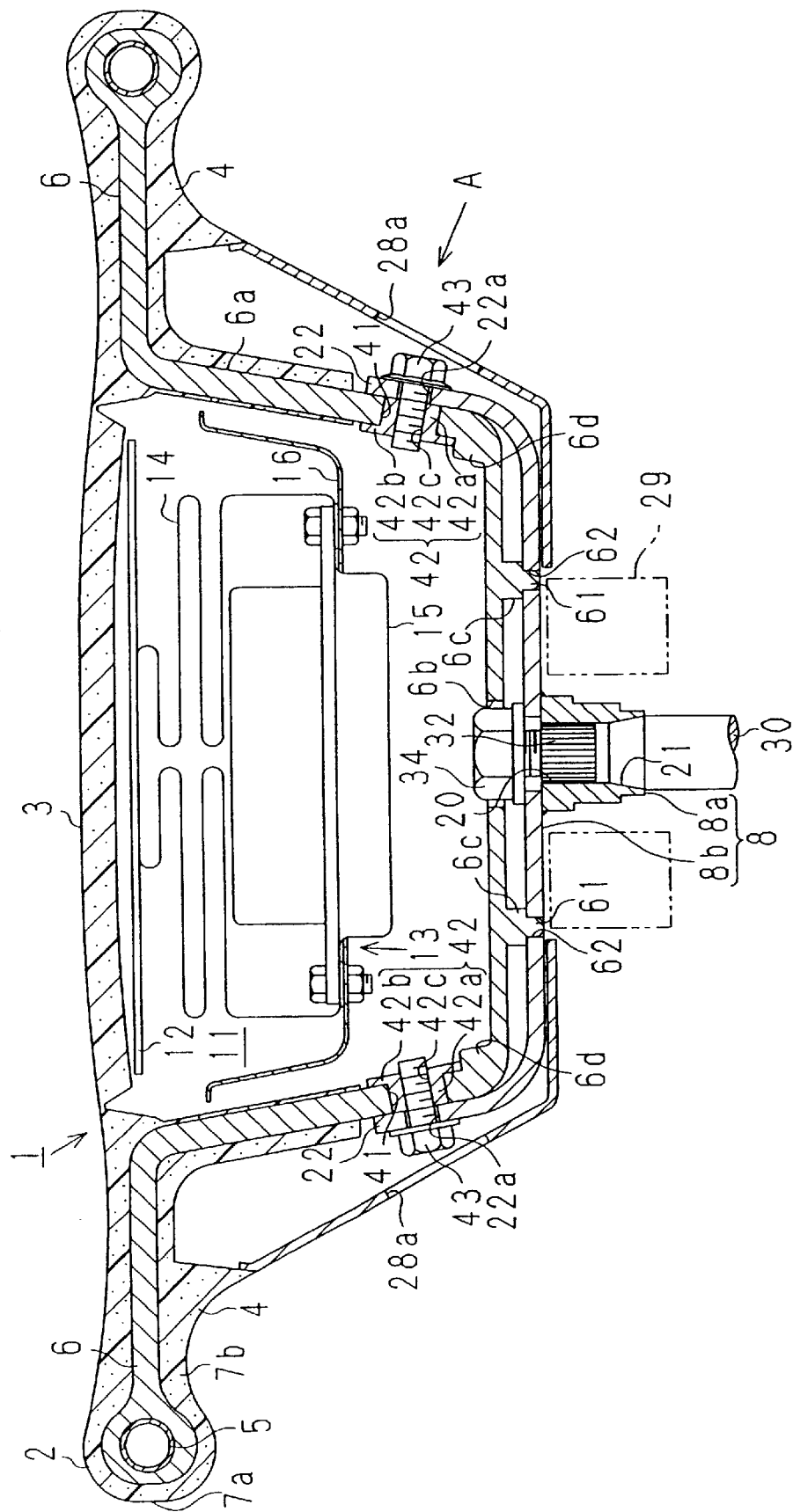

STEERING WHEEL

CROSS REFERENCE TO RELATED APPLICATION

This application is a continuation in part application of U.S. application Ser. No. 08/768,927 filed on Dec. 18, 1996, entitled STEERING WHEEL.

BACKGROUND OF THE INVENTION

1. Field of the Invention

The present invention relates to steering wheels for vehicles, and more particularly to steering wheels that are formed integrally with pads and ring surface layers.

2. Description of the Related Art

A typical steering wheel includes an annular gripping ring and a pad. The pad is located at the center of the ring and connected to the ring by a plurality of spokes. A metal ring core is embedded in the ring while a metal spoke core is embedded in the spokes. A boss plate is connected to the spoke core below the pad to connect the steering wheel to a steering shaft. In this type of steering wheel, fasteners such as bolts are employed to fasten the spoke core to the boss plate. Japanese Unexamined Utility Model Publication No. 2-133955 describes a steering wheel having a pad and a surface layer, which covers the ring. The pad and surface layer are formed integrally.

In the steering wheel of the above publication, the spoke core and the boss plate include bent portions. The bent portions are engaged and fastened to each other by bolts to connect the steering wheel to the boss plate. Due to this structure, the dimensional accuracy of the portion at which the spoke core is fastened to the boss plate differs between products. This may result in insufficient rigidity of the structure.

Accordingly, it is an objective of the present invention to provide a steering wheel that improves the dimensional accuracy of the fastened portion of the spoke core and the boss plate and also enhances the rigidity of the steering wheel.

SUMMARY OF THE INVENTION

To achieve the above objective, a steering wheel is mounted on a steering shaft with a boss plate and has a gripping ring for manually turning the steering shaft. The steering wheel includes a metal ring core embedded in the gripping ring, at least one connecting piece formed integrally with the boss plate, and a spoke core extending between the ring core and the connecting piece. The spoke core has a first end coupled to the ring core and a second end overlapping the connecting piece. The steering wheel further includes a fastener for fastening together the spoke core and connecting piece at the second end of the spoke core.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 1–5 show a first embodiment of a steering wheel according to the present invention, and FIG. 1 is a front view of the steering wheel;

FIG. 2 is a cross-sectional view of the steering wheel taken along line 2—2 in FIG. 1;

FIG. 3 is an exploded cross-sectional view showing the end of the steering shaft and the boss plate of the steering wheel of FIGS. 1 and 2;

FIG. 4 is a partial exploded cross-sectional view showing the fastened portion of a spoke core and a boss plate of the steering wheel of FIG. 1;

FIG. 5 is a partial cross-sectional view showing the spoke core and the boss plate in a fastened state;

FIG. 6 is a partial exploded cross-sectional view showing a spoke core and a boss plate;

FIG. 7 is a partial cross-sectional view showing the spoke core and the boss plate of FIG. 6 in a fastened state;

FIGS. 8–13 show a third embodiment of a steering wheel according to the present invention, and FIG. 8 is a partial front view of the steering wheel from which the pad 3 is removed;

FIG. 9 is a cross-sectional view taken along line 9—9 in FIG. 8;

FIG. 10 is a partial exploded cross-sectional view of the steering wheel of FIGS. 8 and 9;

FIG. 11 is a cross-sectional view taken along line 11—11 in FIG. 8;

FIG. 12 is a partial exploded perspective view of the steering wheel of FIG. 8;

FIGS. 15–20 show a further embodiment of a steering wheel according to the present invention, and FIG. 15 is a front view thereof;

FIG. 16 is a cross-sectional view taken along line 16—16 in FIG. 15;

FIG. 17 is a partial exploded cross-sectional view of the steering wheel of FIG. 16;

FIG. 18 is a cross-sectional view taken along line 18—18 in FIG. 15;

FIG. 19 is an exploded perspective view showing the steering wheel of FIG. 15;

FIG. 21 is a cross-sectional view showing a modification of the steering wheel of FIGS. 15–20 according to a further embodiment;

DETAILED DESCRIPTION OF THE PREFERRED EMBODIMENTS

A first embodiment of a steering wheel according to the present invention will hereafter be described with reference to the drawings.

Figure 1:
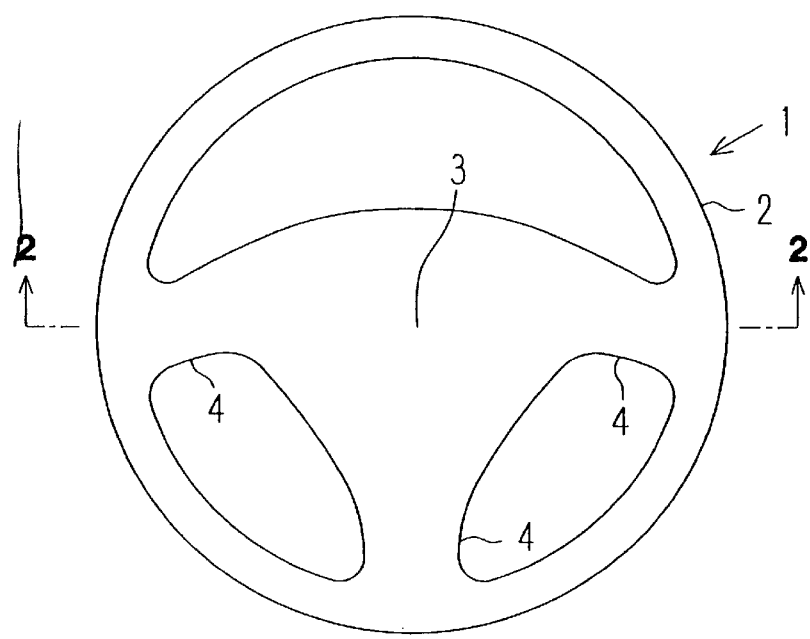

As shown in FIGS. 1 and 2, a body 1 of a steering wheel includes an annular gripping ring 2, a pad 3 arranged in the center of the ring 2, and three spokes 4 connecting the ring 2 with the pad 3. As shown in FIG. 2, the ring 2 is constituted by a metal ring core 5, which may be made of a steel pipe, and a surface layer 7a, which covers the ring core 5. The spokes 4 are constituted by a metal spoke core 6, which is die casted from a light metal such as an aluminum alloy, and a surface layer 7b, which covers the spoke core 6. The surface layers 7a, 7b and the pad 3 are formed integrally from a soft synthetic resin such as polyurethane foam.

A boss plate 8 is coupled to the steering wheel to connect the wheel to a steering shaft 30. The boss plate 8 includes a cylindrical portion 8a, which is located at the center of the plate 8 and made of steel, and a plate portion 8b, which is formed by pressing a steel plate. The cylindrical portion 8a and the plate portion 8b are welded to each other.

The spoke core 6 includes a flat portion 6g, which engages the boss plate 8. A hole 6b is provided at the center of the flat portion 6g. The spoke core 6 also has radial portions, which are covered by the surface layer 7b and extend between the ring core 5 and the center of the core 5. In other words, the spoke core 6 has three radial portions. Among the three radial portions, two are substantially arranged along a single line extending through the center of the steering wheel. The spoke core 6 further includes an oblique connecting portion 6a, which extends downwardly from each radial portion. The connecting portions 6a are connected integrally with the flat portion 6g below the pad 3. In the same manner as the radial portions, among the three connecting portions 6a, two are substantially arranged along a single line extending through the center of the steering wheel.

An accommodating recess 11 is defined below the pad 3. A membrane switch 12 and an air bag apparatus 13 are arranged in the recess 11. The membrane switch 12 has a pair of thin plates, which constitute part of a horn switch circuit (not shown). When the pad 3 is pressed, the thin plates contact each other and activate the horn.

The air bag apparatus 13 includes an air bag 14, which is retained in a folded state, an inflator 15, which is used to inflate the air bag 14, and a bag holder 16, which securely holds the air bag 14 and the inflator 15. The bag holder 16 is fixed to the spoke core 6 by a pair support arms 17, which are made of L-shaped iron plates.

Figure 3:
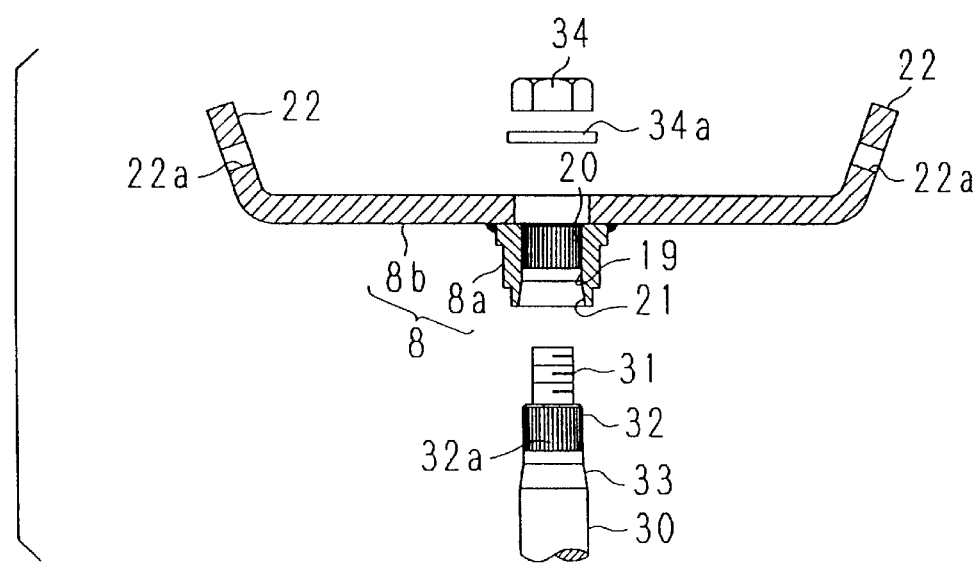

The steering wheel assembly will now be described with reference to FIGS. 3 and 4. As shown in FIG. 3, a threaded portion 31 is defined at the distal end of the steering shaft 30. A splined portion 32 and a tapered surface 33 are defined below the threaded portion 31. A predetermined number of splines (generally about 30) are provided in the splined portion 32.

The boss plate 8 is fit onto the distal end of the steering shaft 30 and fixed to the shaft 30 by a nut 34, which is screwed onto the threaded portion 31. A washer 34a is provided between the nut 34 and the boss plate 8. A hole 19 is defined in the center of the cylindrical portion 8a. A splined portion 20 and a tapered surface 21 are defined in the walls of the hole 19. The splined portion 20 engages the splined portion 32 of the steering shaft 30 while the tapered surface 21 engages the tapered surface 33 of the shaft 30.

A pair of oblique connecting pieces 22 extend upward from both sides of the plate portion 8b of the boss plate 8. A through hole 22a having a diameter slightly larger than that of a bolt 27 (described later) is defined in each connecting piece 22.

Figure 4:
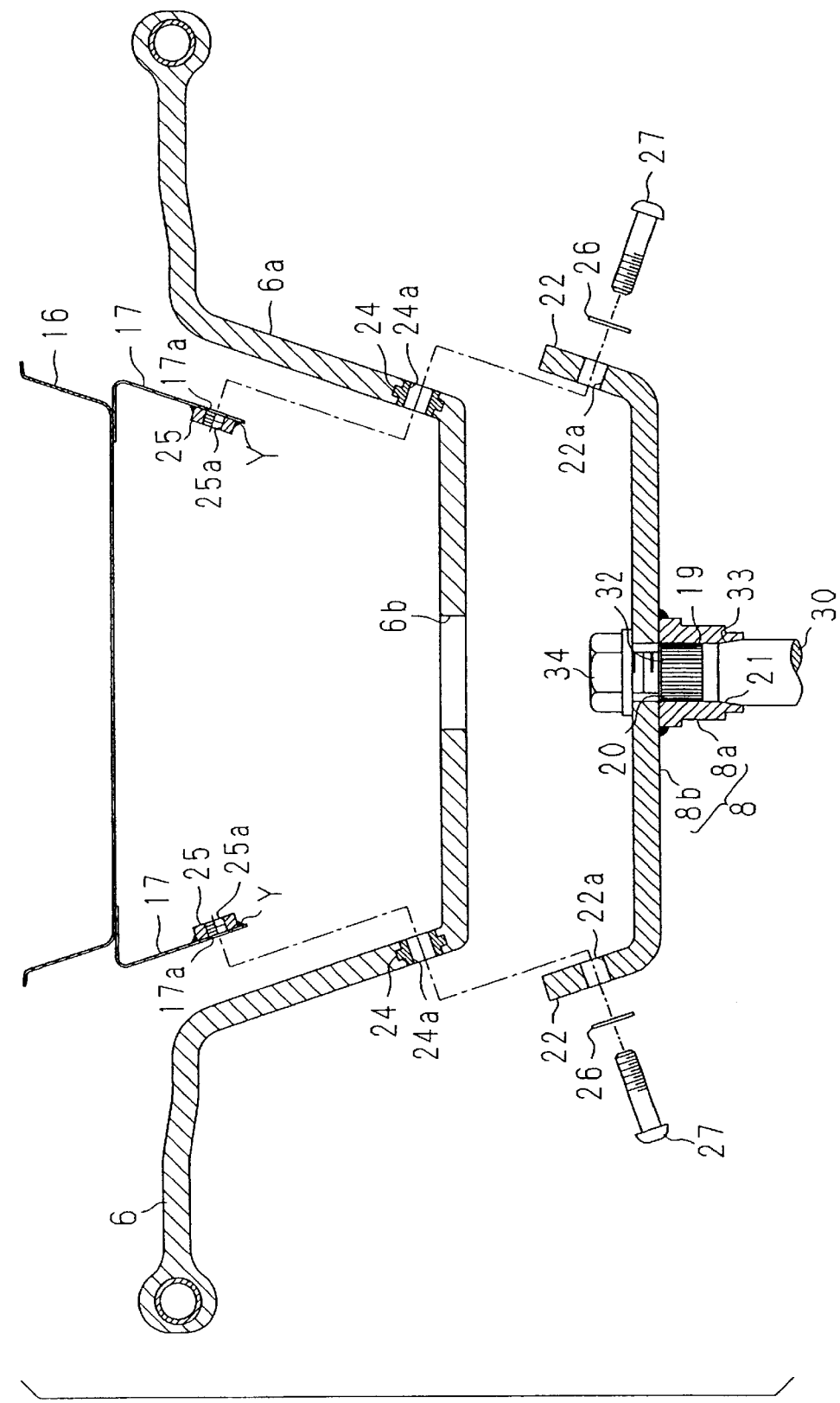

As shown in FIG. 4, a cylindrical bolt insert 24, which is made of an iron-based material, is formed integrally with the two connecting portions 6a that are arranged along a single line extending through the center of the steering wheel. A through hole 24a is defined in each bolt insert 24. The axis of the through hole 24a is aligned with the axis of the through hole 22a of the associated connecting piece 22 when the spoke core 24 is arranged overlapping the connecting piece 22. The bolt insert 24 is casted when the spoke core 6 is die casted. In this embodiment, the holes 22a, 24a respectively defined in the connecting piece 22 and the bolt insert 24 are employed as bolt insertion holes. When aligned, the associated holes 22a, 24a extend in a direction intersecting the axis of the steering shaft 30.

A hole 17a is defined in each support arm 17. A weld nut 25, the axis of which is aligned with the axis of the hole 17a, is welded and fixed to the support arm 17. A threaded portion 25a is defined in the weld nut 25. More specifically, the support arms 17 and the associated weld nuts 25 are made of an iron-based metal and securely fixed to each other through resistance welding. In the drawing, Y denotes a welding portion. The bolt 27 is screwed into the weld nut 25 to fasten together the associated connecting portion 6a, connecting piece 22, and washer 26.

As shown in FIG. 2, a cover 28 encompasses the lower side of the spoke core 6. Holes 28a are defined in the cover 28 to allow insertion of the bolts 27 and tools, which are used to fasten the bolts 27. A spiral cable 29, which is used for supplying electric power to the air bag apparatus 13 and other parts, is arranged about the outer side of the steering shaft 30.

To couple the steering wheel to the steering shaft 30, the boss plate 8 is fitted onto the distal end of the steering shaft 30, as shown in FIG. 3. The splined portion 30 of the steering shaft 30 is meshed with the splined portion 20 of the boss plate 8. In this state, the washer 34a is fit onto the threaded portion 31 of the steering shaft 30. The nut 34 is then screwed onto the threaded portion 31 to fasten the boss plate 8 to the shaft 30.

Figure 5:
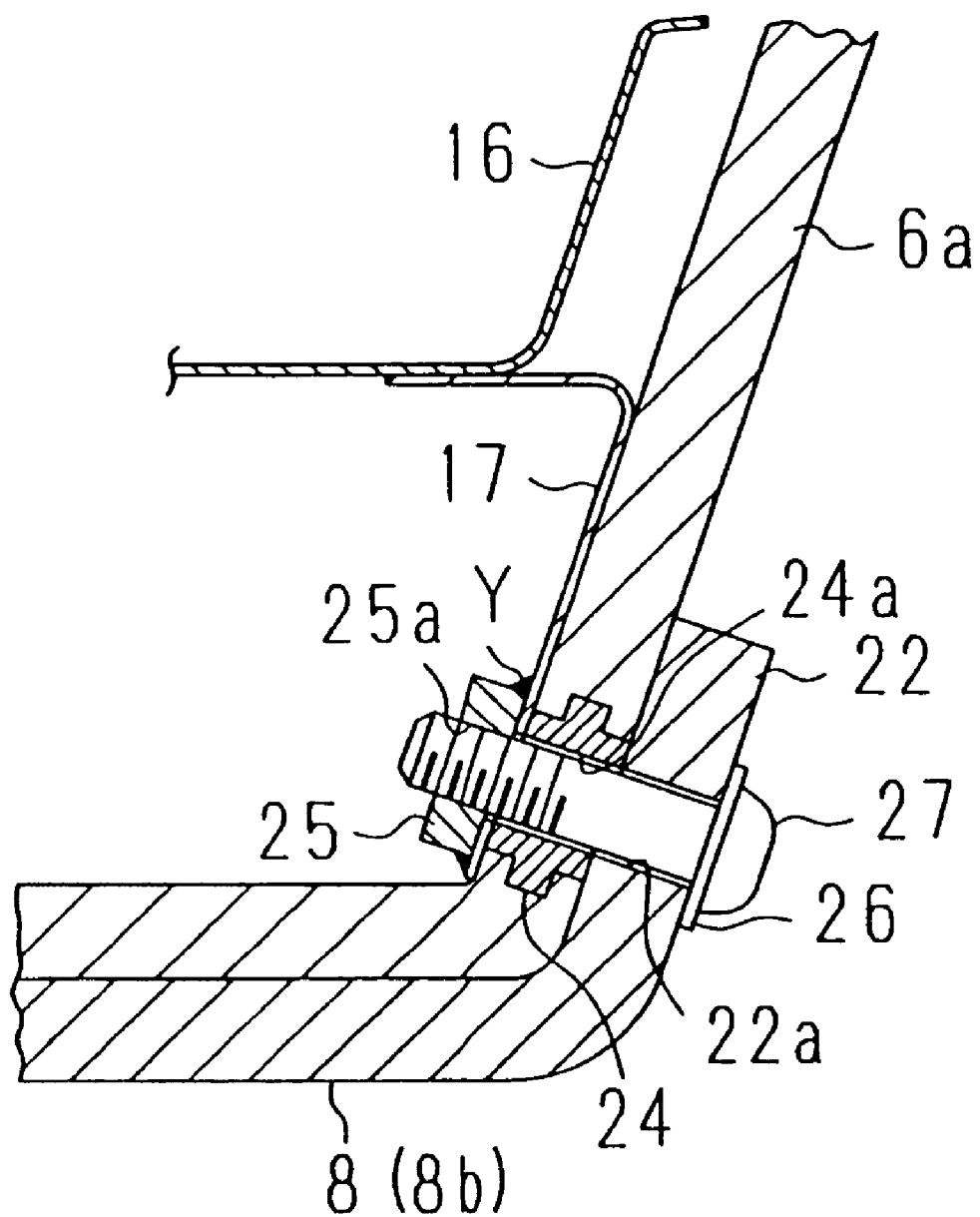

As shown in FIGS. 4 and 5, the bag holder 16 and the spoke cores 6 are placed on the boss plate 8. The bag holder 16 and the spoke cores 6 are arranged on the boss plate 8 so that the through holes 22a of the boss plate 8 are aligned with the through holes 24a of the associated connecting portion 6a and the threaded portions 25a of the associated weld nuts 25 at opposite sides of the steering shaft 30.

The bolts 27 are inserted into each set of aligned holes 22a, 24a from the outer side of the steering wheel and screwed into the threaded portion 25a of the associated weld nut 25. The coupling of the steering wheel to the steering shaft 30 is completed when the air bag apparatus 13 is accommodated in the bag holder 16.

The first embodiment according to the present invention yields the advantageous effects described below.

(a) The associated radial portions and connecting portions 6a are formed integrally with the flat portion 6g below the pad 3. The spoke core 6 and the boss plate 8 are fastened together by the bolts 27, which are inserted through the bolt insertion holes (the through holes 22a of the connecting piece 22 and the through hole 24a of the associated bolt insert 24). This structure prevents displacement of various members. Furthermore, this structure enhances the rigidity of the entire structure including the ring 2 and the spokes 4. That is, the dimensional accuracy at the bolt fastening portion is improved and the rigidity of the steering wheel is reinforced.

(b) The bolt insertion holes (the through hole 22a of the connecting piece 22 and the through hole 24a of the corresponding bolt insert 24) are provided so as to enable insertion of the bolts 27 from the outer side of the steering wheel. This eliminates the necessity to fasten bolts at positions located directly below the steering wheel and facilitates the fastening procedure. In particular, the steering wheel may be coupled to or removed from the steering shaft 30 without interference with the spiral cable 29, which is arranged about the shaft 30 and used for supplying electric power to the air bag apparatus 13 and other parts. Accordingly, this structure facilitates the mounting of the steering wheel.

(c) The bolt inserts 24, which are made of an iron-based metal, are arranged in the spoke cores 6, which are die casted from aluminum, in correspondence with the fastening position of the bolts 27. The spoke cores 6 and the boss plate 8 are fastened together by bringing into contact iron-based metals, which have a high degree of hardness. Accordingly, plastic deformation of the surfaces of the spoke cores 6 and the boss plate 8, which come into contact with one another, is suppressed. This prevents problems such as fatigue and deformation.

(d) The weld nuts 25 are welded to the support arms 17 that are fixed to the bag holder 16. Thus, the stress produced when fastening each bolt 27 is not concentrated at the associated weld nut 25. The stress is distributed throughout the entire support arm 17. Accordingly, deterioration of the spoke cores 6 at the periphery of the through holes 22 is prevented. Furthermore, the weld nuts 25 may be held at the desired fastening position below the pad 3. This facilitates the fastening procedure using the bolts 27. Together with the effects described in paragraphs (c) and (d), the deterioration of the spoke cores 6 is further suppressed.

A second embodiment, which is a partial modification of the first embodiment, will hereafter be described with reference to FIGS. 6 and 7. Parts that are identical to those employed in the first embodiment will be denoted with the same numeral.

Figure 6:
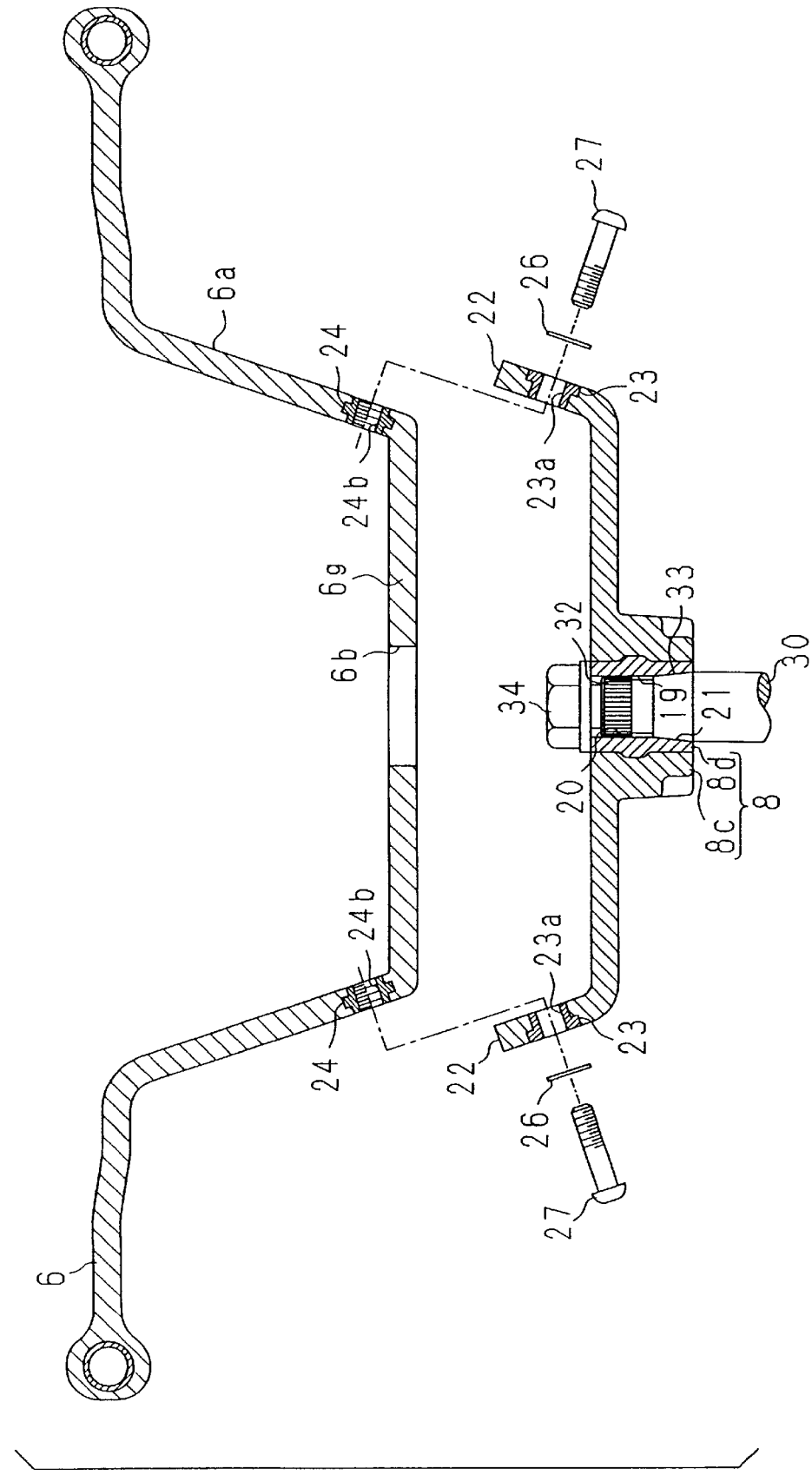
FIGS. 6 and 7 show a second embodiment of a steering wheel according to the present invention.
Figure 7:
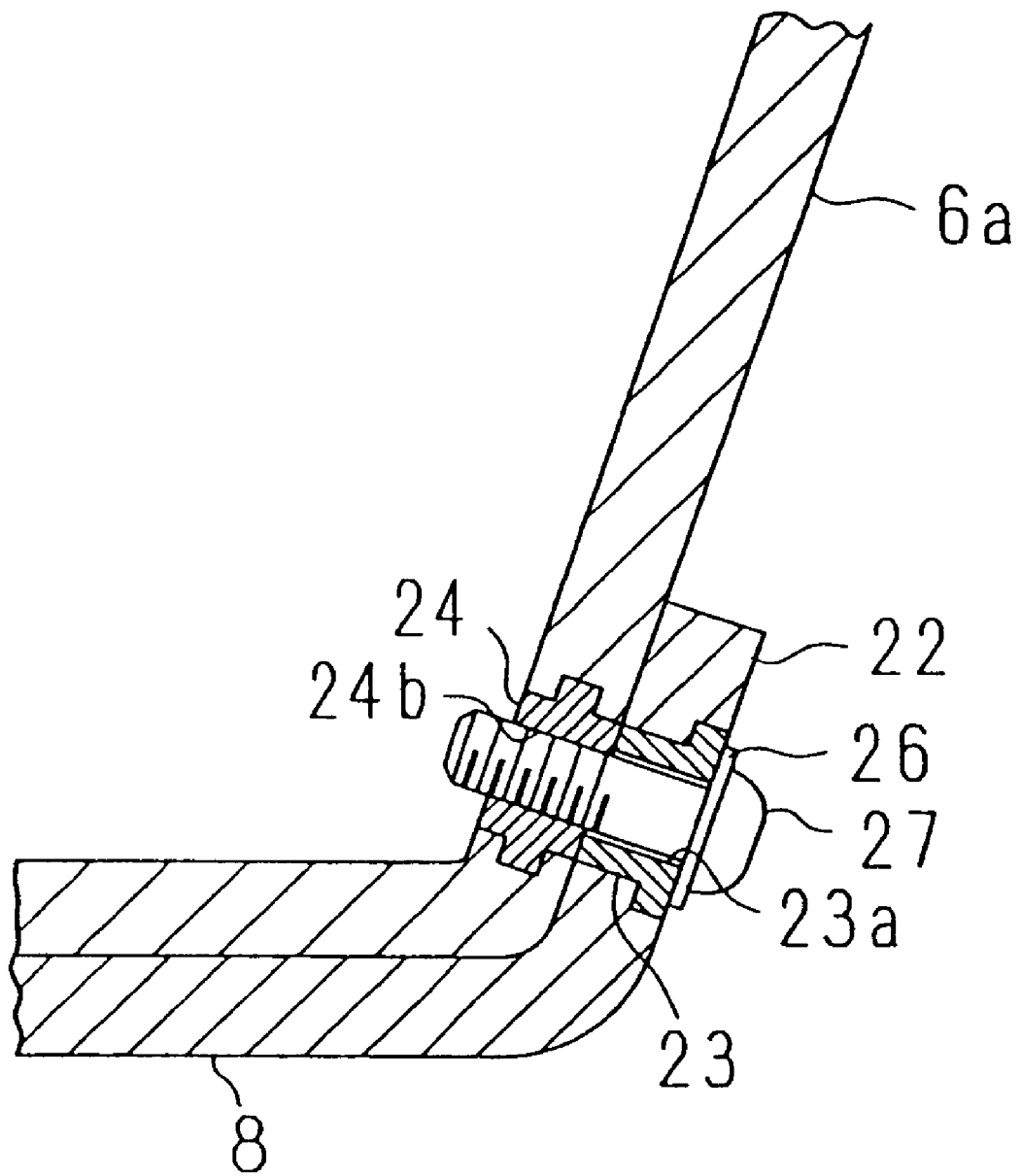

Substantially, the entire portion of the boss plate 8, which is shown in FIG. 6, is die casted from aluminum. A boss 8c is defined at the center of the boss plate 8. A cylindrical shaft insert 8d, which is made of steel, is provided in the boss 8c. Connecting plates 22 are provided at both sides of the boss plate 8. A cylindrical bolt insert 23, which is made of an iron-based metal, is formed integrally with each connecting piece 22. A through hole 23a is defined in each bolt insert 23. The diameter of the through hole 23a is slightly larger than that of the bolt 27. Each bolt insert 23 is casted when the boss plate 8 is die casted.

In addition, a bolt insert 24 is arranged in two connecting portions 6a of the spoke core 6. A threaded portion 24b is defined in each bolt insert 24. The bolt inserts 24 are employed to substitute the weld nuts 25 of the first embodiment. The through hole 23a of the bolt insert 23 arranged in the connecting piece 22 and the threaded portion 24b of the associated bolt insert 24 serves as a bolt insertion hole.

In this embodiment, the spoke core 6 is placed on the boss plate 8. The bolts 27 are inserted into the through holes 22a of the connecting pieces 22 and screwed into the associated threaded portion 24a.

In the same manner as in the first embodiment, the second embodiment prevents the bolt insertion holes of the spoke cores 6 from being misaligned and improves dimensional accuracy while also enhancing rigidity of the steering wheel. Furthermore, the weight of the steering wheel is reduced since a large portion of the boss plate 8 is die casted from aluminum.

A third embodiment, which is a partial modification of the preceding embodiments, will hereafter be described with reference to FIGS. 8 to 13. Parts that are identical to those employed in the first embodiment will be denoted with the same numeral. The only difference in this embodiment from the above embodiments is the structure of the bolt fastening portion and the shape of the spoke core 6.

Figure 9:
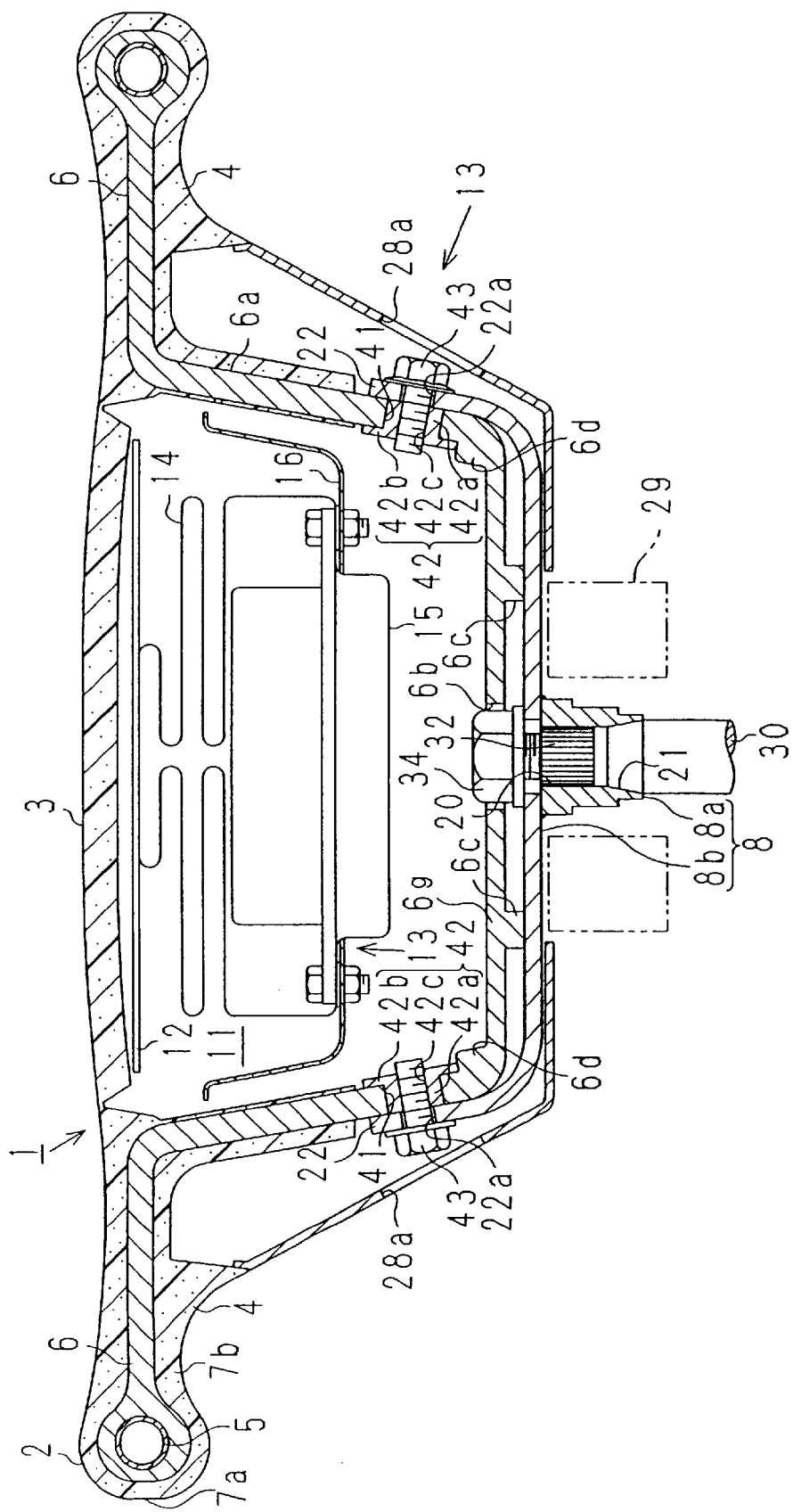
Figure 10:
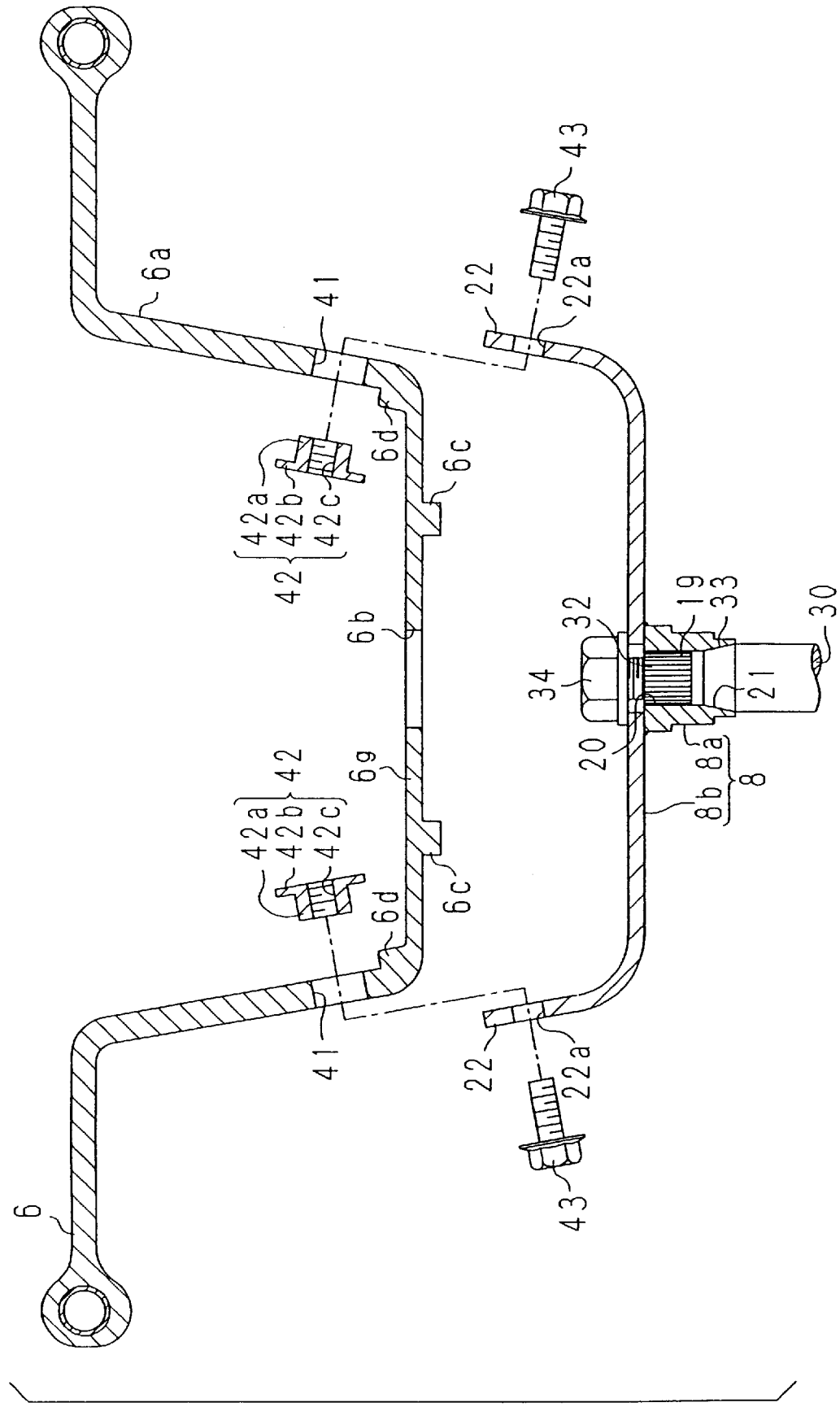

As shown in FIG. 9, through holes 41 are defined in two connecting portions 6a of the spoke core 6. When these connecting portions 6a are arranged overlapping the connecting pieces 22 of the boss plate 8, the axis of each through holes 41 is aligned with the axis of the through hole 22 of the associated connecting piece 22. A projection 6d projects from the inner side of each connecting portion 6a at a position lower than the associated through hole 41.

A collar 42, which is made of an iron-based metal, includes a cylindrical portion 42a and a square restricting portion 42b. The height of the cylindrical portion 42a is substantially equal to the length of each through hole 41. The restricting portion 42b is formed integrally with the inner end of the cylindrical portion 42a. A threaded portion 42c is defined in the collar 42. When the cylindrical portion 42a is fit into one of the through holes 41 from the inner side of the associated connecting portion 6a, the lower end of the restricting portion 42b abuts against the upper end of the associated projection 6d.

Figure 8:
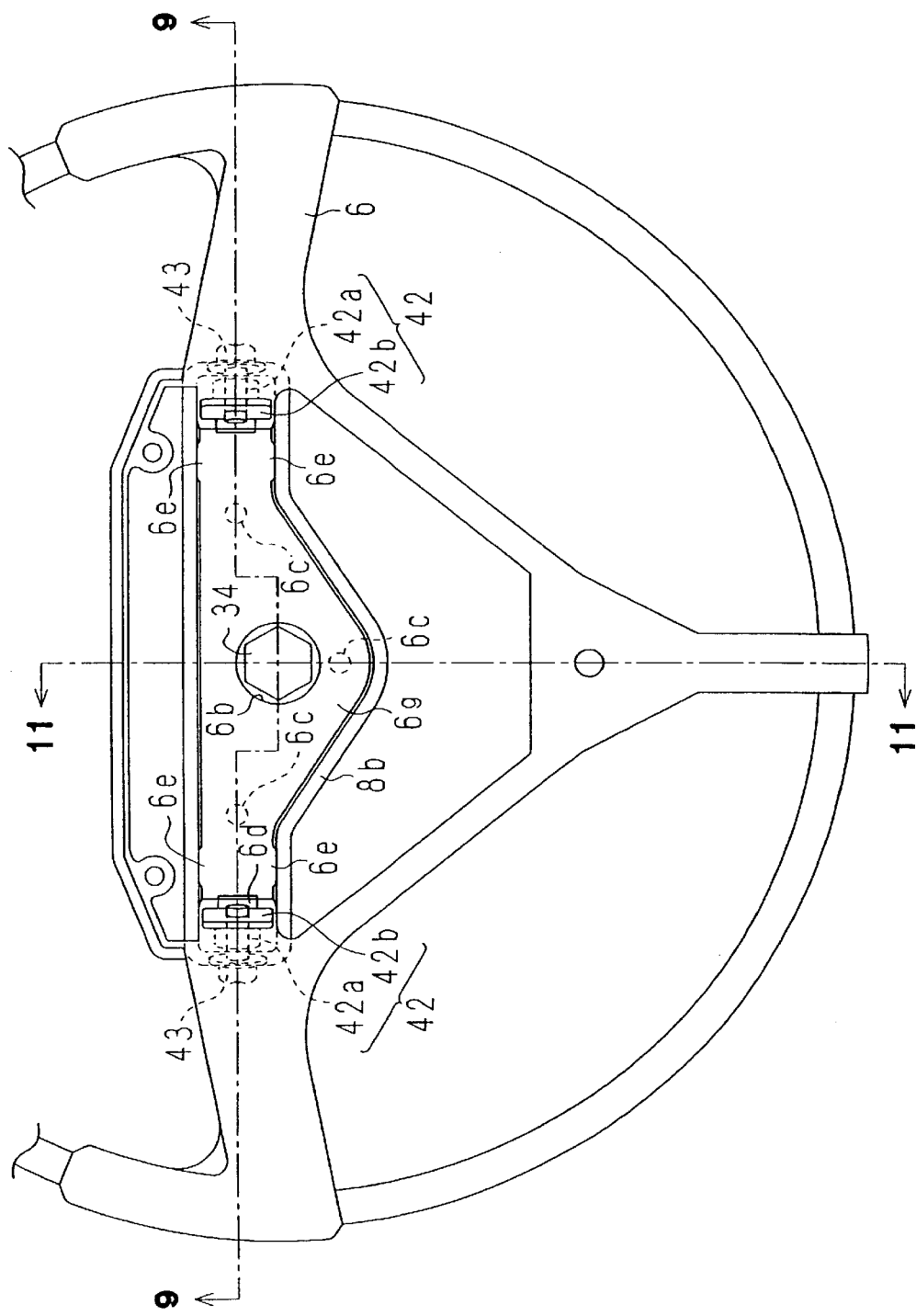
Figure 12:
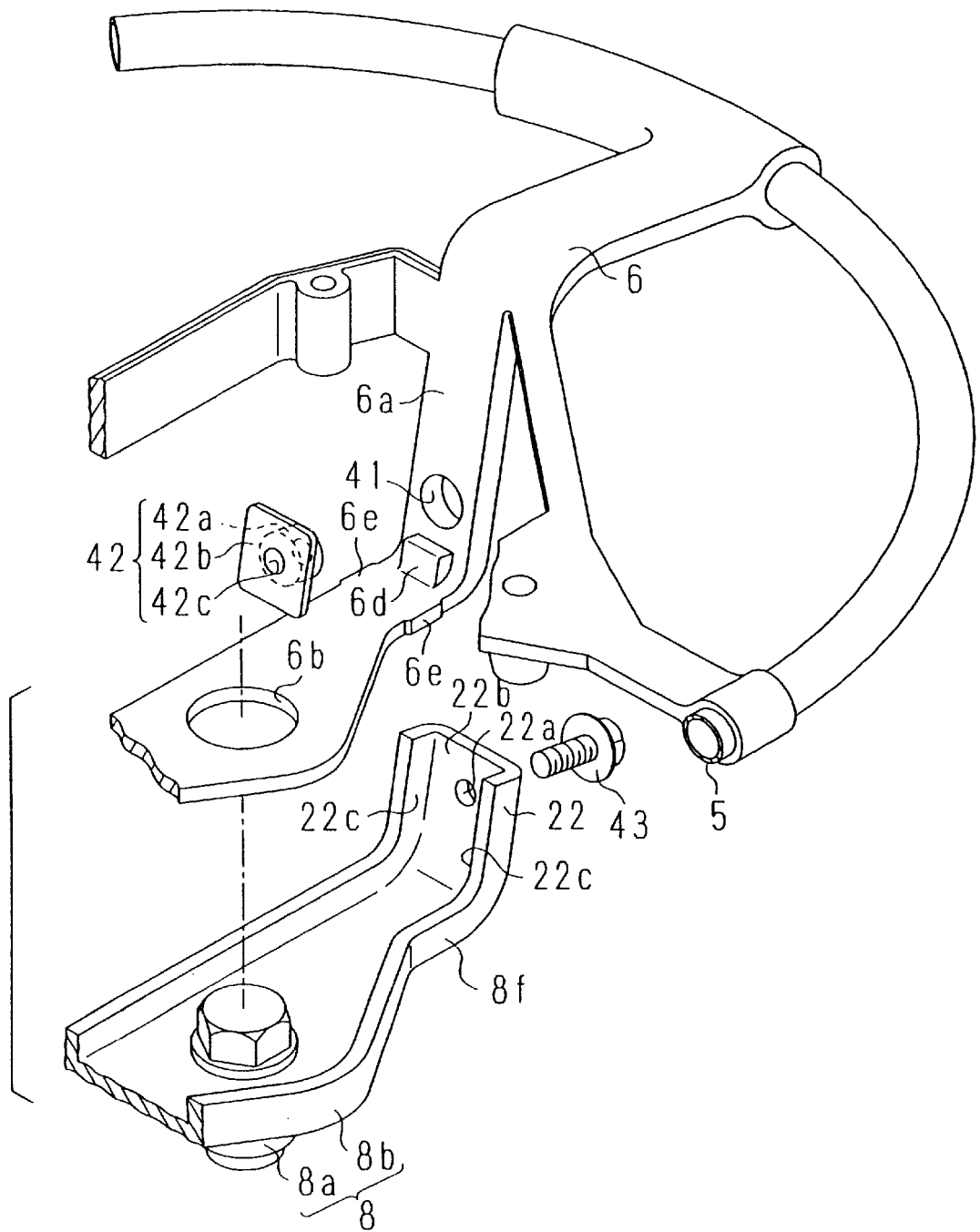

As shown in FIGS. 8 and 9, three projections 6c project from the bottom surface of the flat portion 6g with a predetermined interval provided between one another. Each projection 6c defines a vertex of a triangle, the center of which coincides with the hole 6b provided at the center of the flat portion 6g. As shown in FIGS. 8 and 12, four extended portions 6e extend horizontally from the plate portion 6g. The extended portions 6a are located near the sides of the plate portion 6g with a predetermined interval provided between one another. Reinforcing ribs 8f are formed substantially along the entire periphery of the boss plate 8. The ribs 8f are integral with the boss plate 8. Each rib 8f extends along the plate portion 8b and the connecting pieces 22. When the flat portion 6g is placed on the boss plate 8, the extended portions 6e are engaged with the inner side of the reinforcing ribs 8f and position the flat portion 6g. In this embodiment, a bolt insertion hole is defined by the aligned through hole 22a in each connecting piece 22 of the boss plate 8 and the threaded portion 42c in the associated collar 42.

Figure 11:
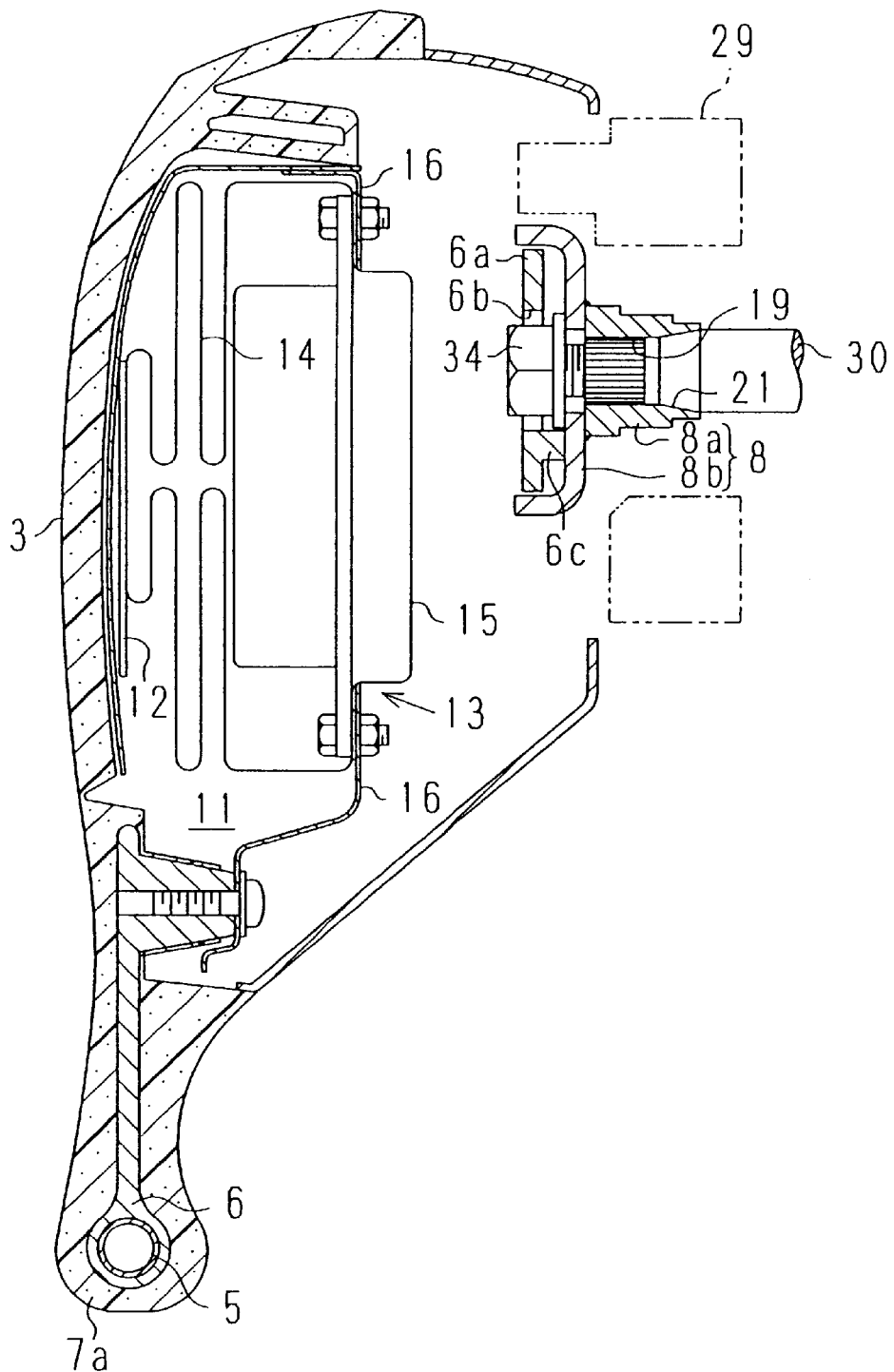

To mount the spoke core 6 to the boss plate 8, the collars 42 are fit into the associated through holes 41 from the inner side of the spoke core 6. The spoke core 6 is then arranged overlapping the boss plate 8. As shown in FIGS. 9 and 11, the three projections 6c are abutted against the upper surface of the boss plate 8. Furthermore, the extended portions 6e are engaged with the inner surface of the associated reinforcing ribs 8f. This prevents the flat portion 6g of the spoke core 6 from being held loosely in the horizontal direction.

Afterwards, the bolts 43 are inserted into the through hole 22a of each connecting piece 22 and screwed into the threaded portion 42c of the associated collar 42. The abutment of the lower end of the restricting portion 42b of the collar 42 against the upper end of the associated projection 6d prevents rotation of the collar 42. The fastening of the spoke core 6 and the connecting pieces 22 with the bolts 43 presses the bottom surface of the projections 6c against the boss plate 8. This prevents the flat portion 6g of the spoke core 6 from being held loosely in the horizontal direction.

Figure 13A:
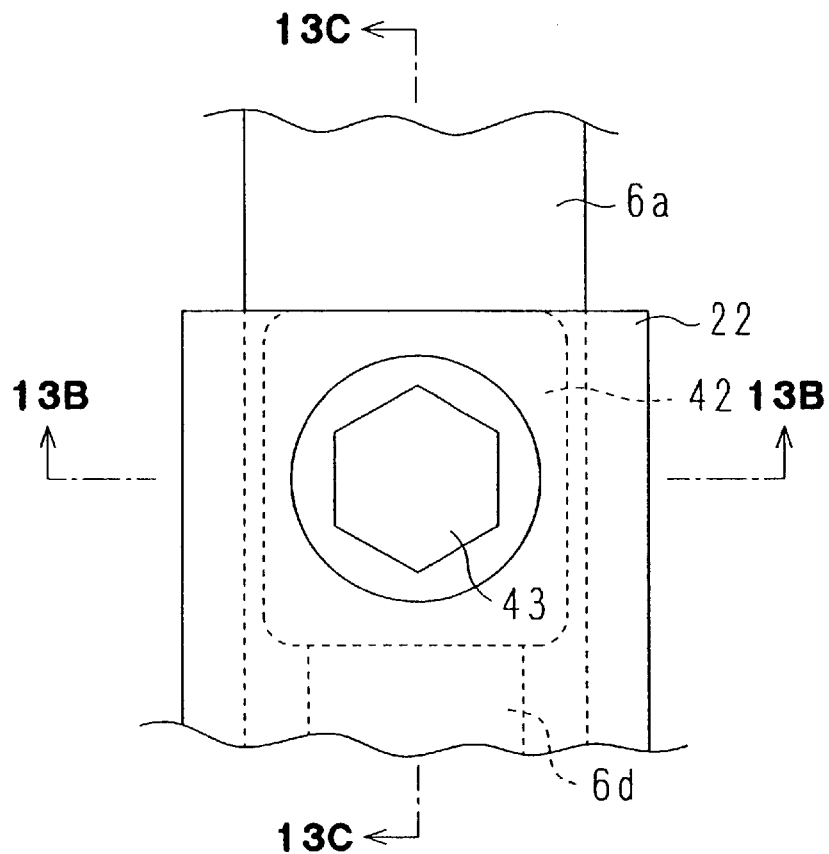
FIG. 13(a) shows a portion of the steering wheel as viewed in the direction of arrow 13 in FIG. 9.
Figure 13B:
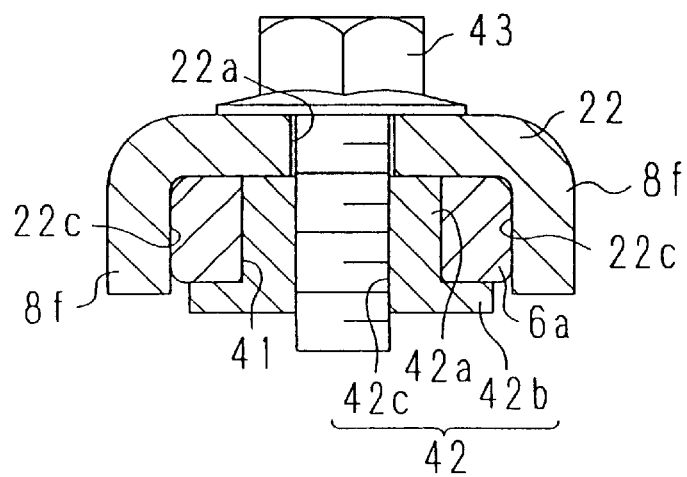
FIG. 13(b) is a cross-sectional view taken along line 13B—13B in FIG. 13(a)

As shown in FIG. 13(b), the cooperation between the restricting portion 42b of the collar 42 and the associated bolt 43 clamps the associated connecting portion 6a and connecting piece 22. The rims of the connecting portion 6a abuts against the inner surface 22c of each reinforcing rib 8f. Accordingly, this further prevents the spoke core 6 from being held loosely. Each bolt 43 is provided with an integral washer.

The advantageous effects described below are obtained from the third embodiment.

(a) In the same manner as the preceding embodiments, displacement of the various members in the bolt fastening portion is eliminated. This improves dimensional accuracy and enhances rigidity.

(b) The collars 42 are fit into the associated connecting portions 6a. Thus, the collars 42 need not be casted when die casting the spoke core 6. This simplifies the production of the connecting portions 6a.

The third embodiment may also be modified as described below while also obtaining the same advantageous effects.

Figure 14A:
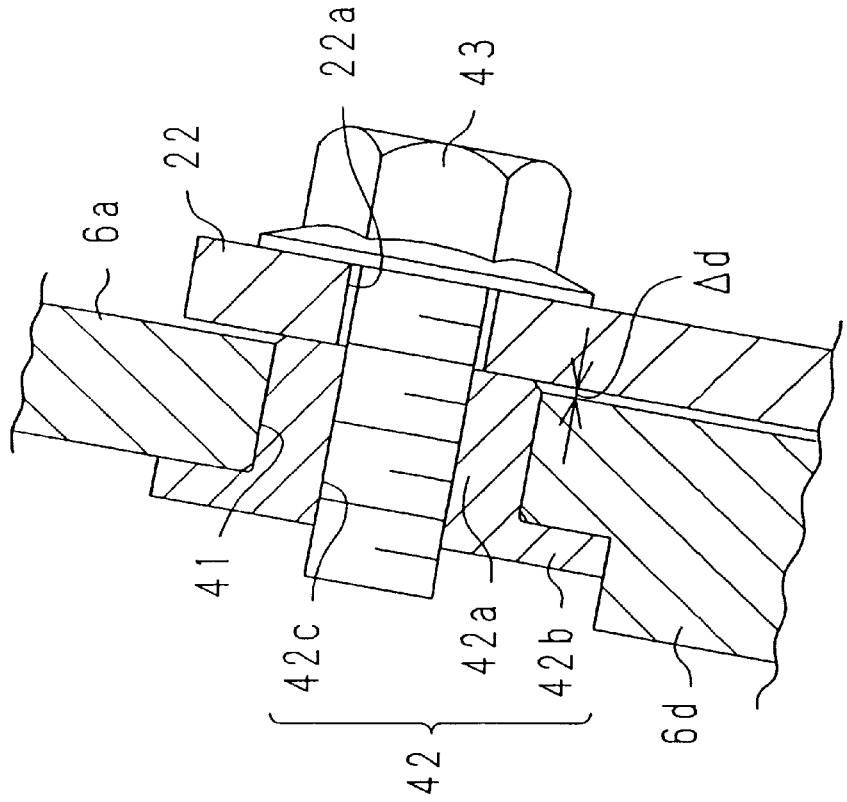
FIGS. 14(a) and 14(b) show further embodiments that are modifications of the third embodiment and are cross-sectional views as seen from the direction indicated by line 13C—13C in FIG. 13(a)

(1) As shown in FIG. 14(a), the height of the cylindrical portion 42a of each collar 42 is smaller than the width of the associated connecting portion 6a. This defines a gap Δd between the collar 42 and the connecting piece 22 when the connecting piece 22 and the connecting portion 6a are loosely fastened by the bolt 43. When an elastic alloy is used as the material of the connecting portion 6a, elastic deformation caused by the tightening of the bolt 43 eliminates the gap Δd and allows the collar 42 to abut against the connecting piece 22. The elastic deformation of the connecting portion 6a corresponding to the length of the gap Δd substitutes the function of a spring washer. This further prevents the loosening of the bolt 43.

Figure 14B:
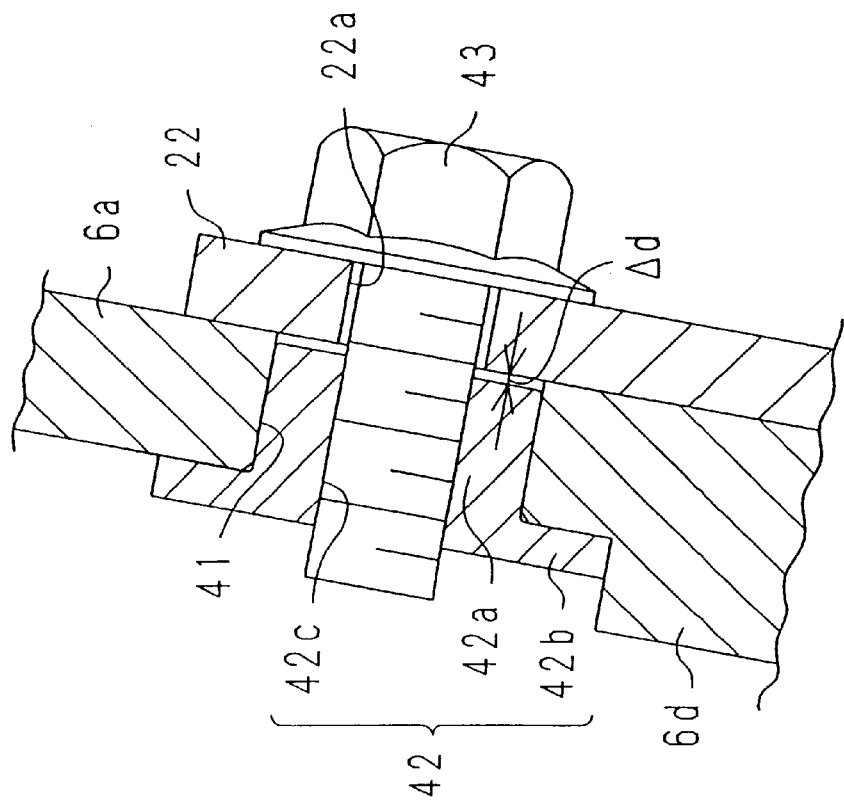

(2) As shown in FIG. 14(b), the height of the cylindrical portion 42a of each collar 42 is greater than the width of the associated connecting portion 6a. This defines a gap Δd between the collar 42 and the connecting piece 22 when the connecting piece 22 and the connecting portion 6a are loosely fastened by the bolt 43. A non-elastic alloy may be used as the material of the connecting portion 6a. In this case, the spoke core 6 and the boss plate 8 are fastened to each other by the bolt 43 with the connecting piece 22 and the associated collar 42, which are both made of an iron-based material and have a high degree of hardness, contacting each other. Accordingly, this structure suppresses plastic deformation of the contacting surfaces.

A further embodiment, which is a partial modification of the third embodiment, will hereafter be described with reference to FIGS. 15 to 20. Parts that are identical to those employed in the third embodiment will be denoted with the same numeral. The only difference in this embodiment from the third embodiment is the structure of the bolt fastening portion.

Figure 16:
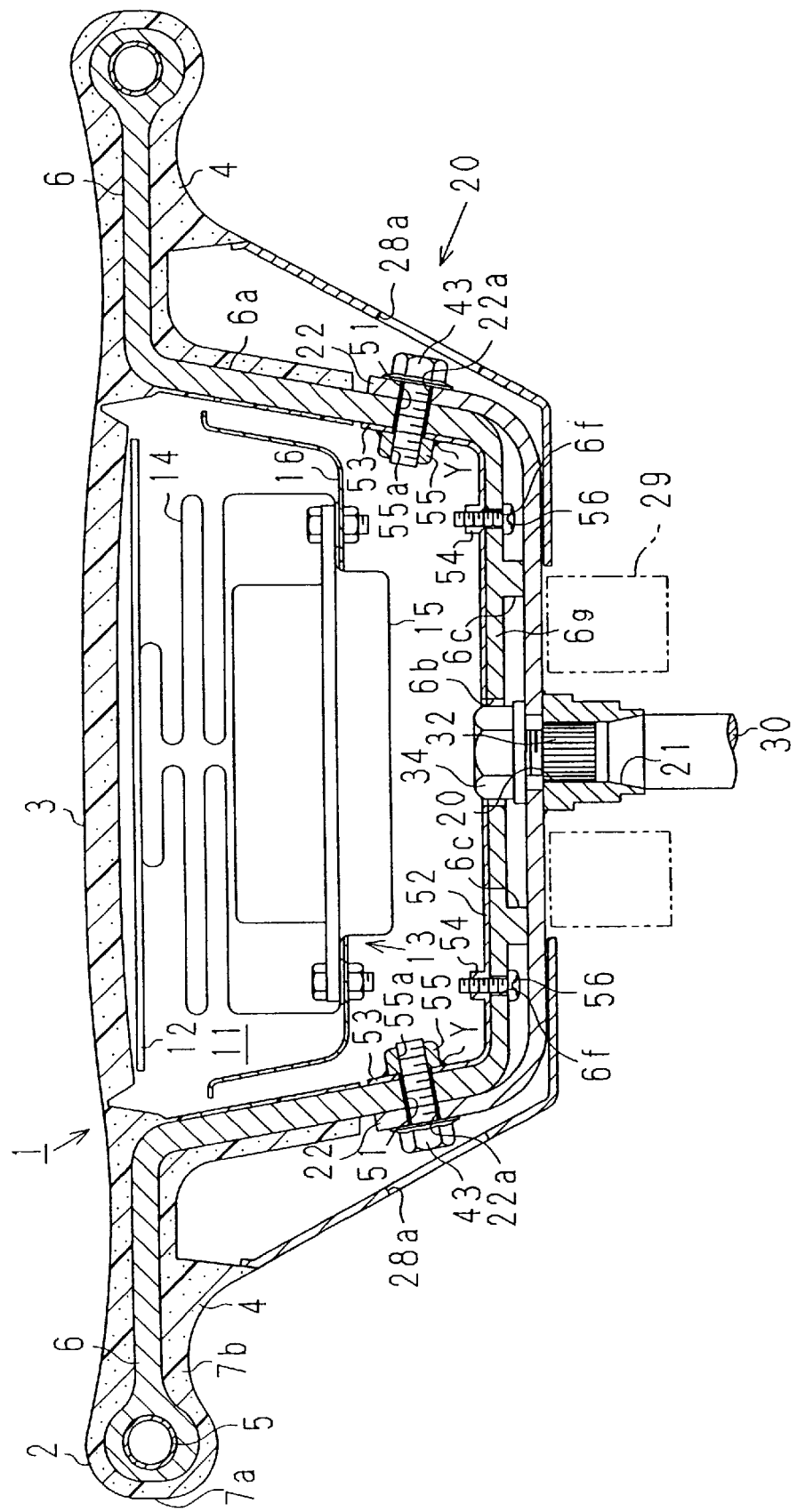

As shown in FIG. 16, a pair of through holes 6f are defined in the flat portion 6g of the spoke core 6 at opposite sides of the hole 6b. A pair of through holes 51 are defined in the connecting portions 6a of the spoke core 6. When the spoke core 6 is engaged with the associated connecting piece 22, the axes of the through hole 22a of the piece 22 and the corresponding through hole 51 are aligned with each other. The holes 51, 22a have equal diameters.

Figure 17:
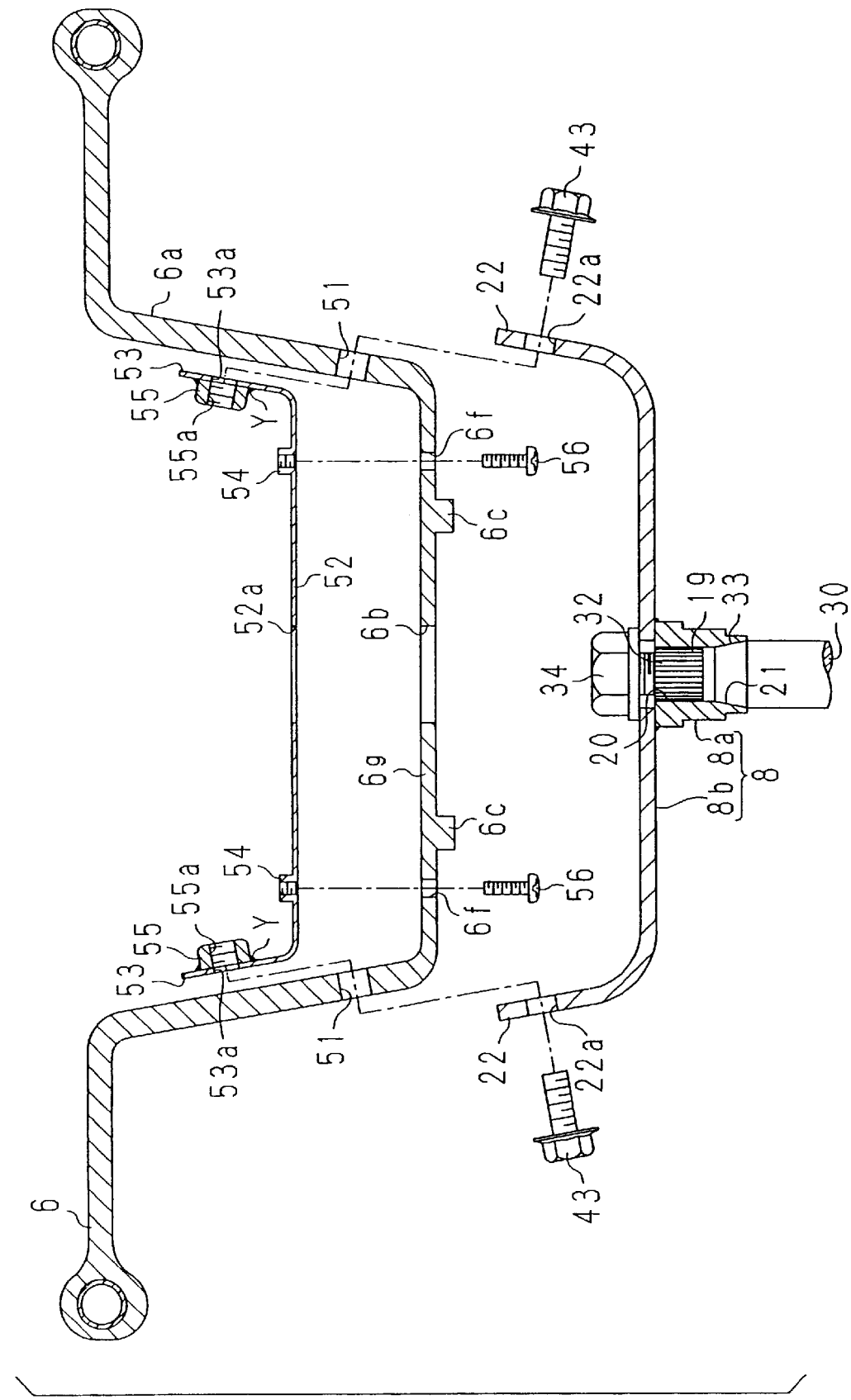
Figure 18:
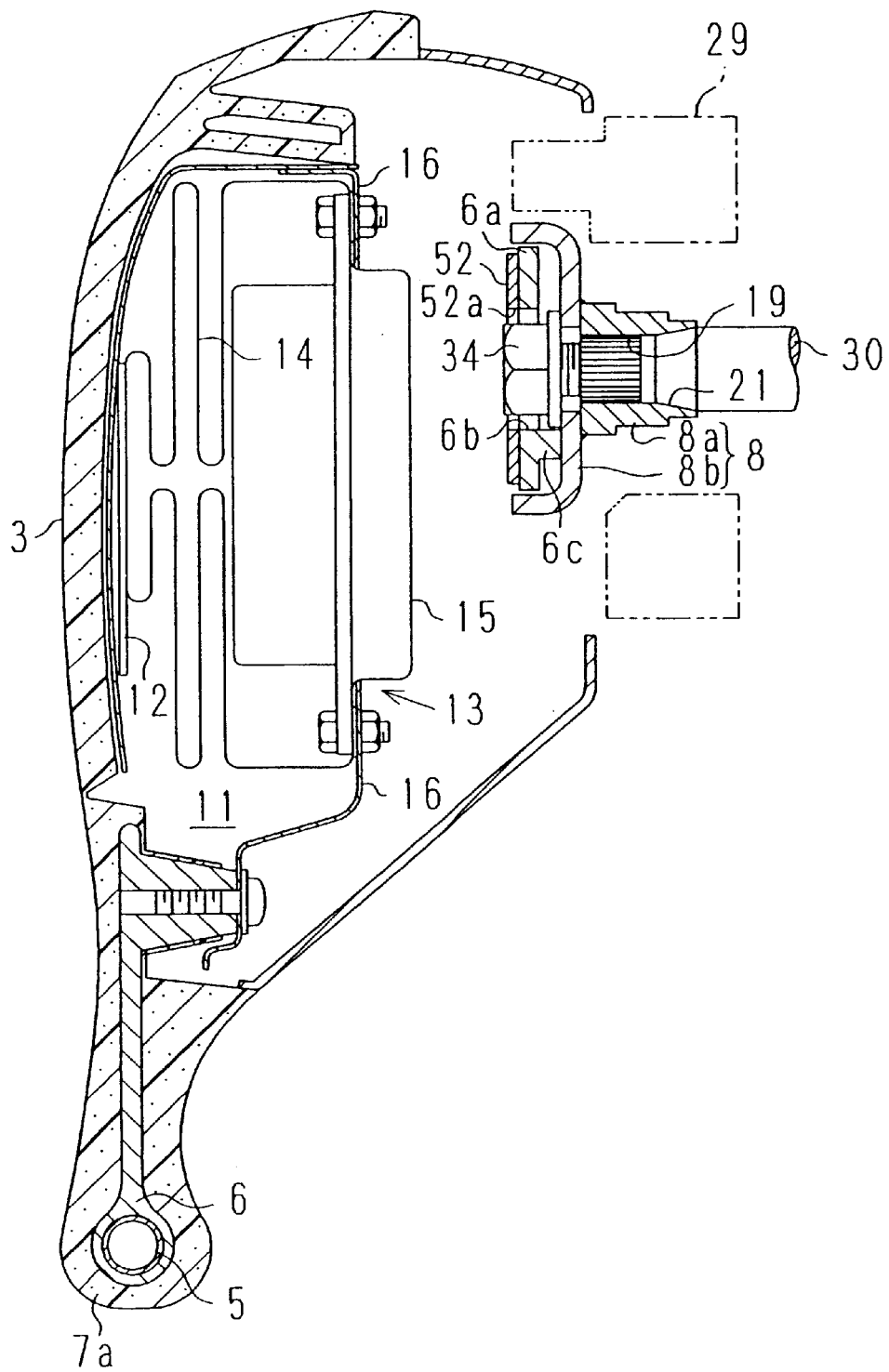
Figure 19:
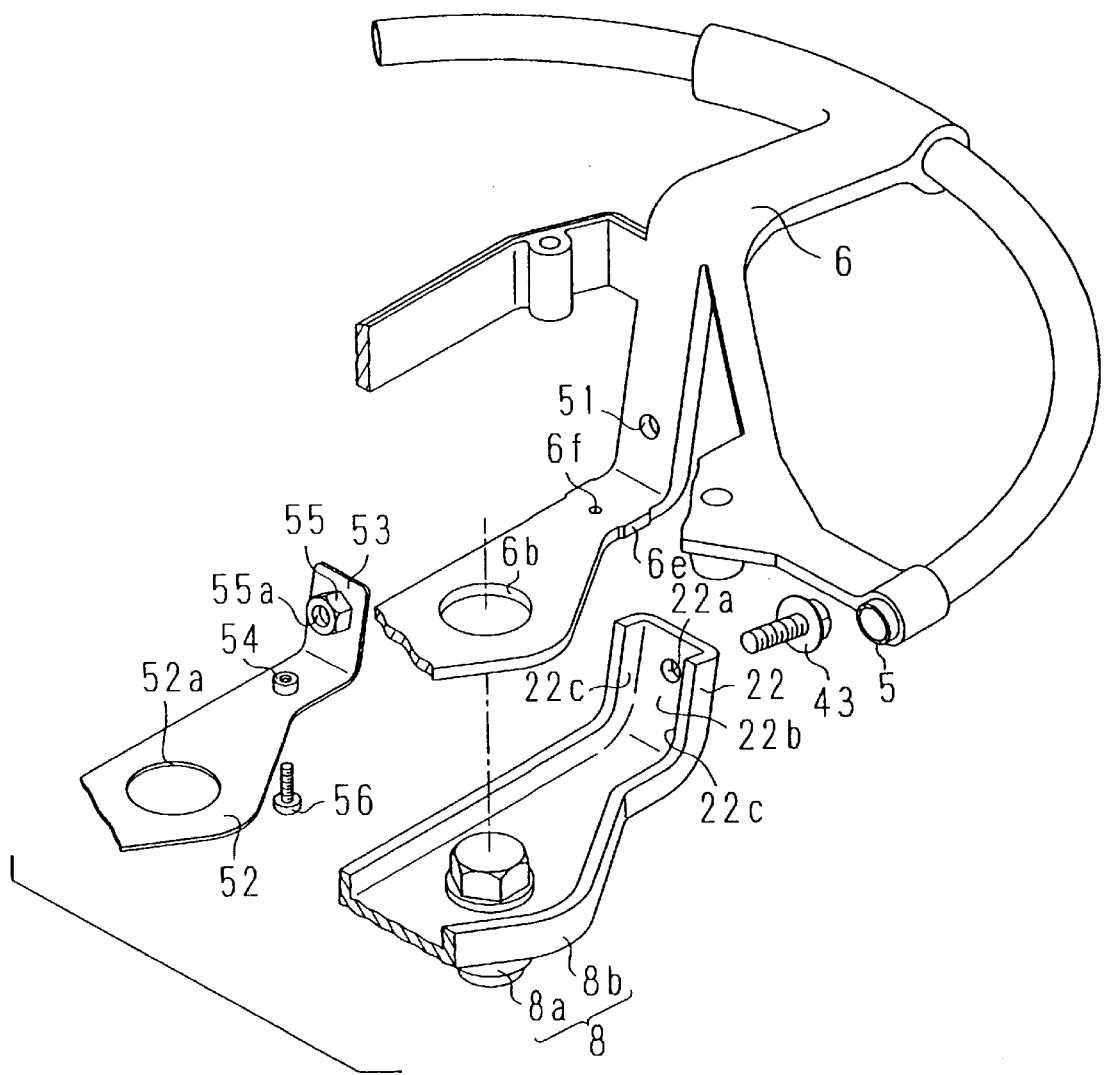
Figure 20A:
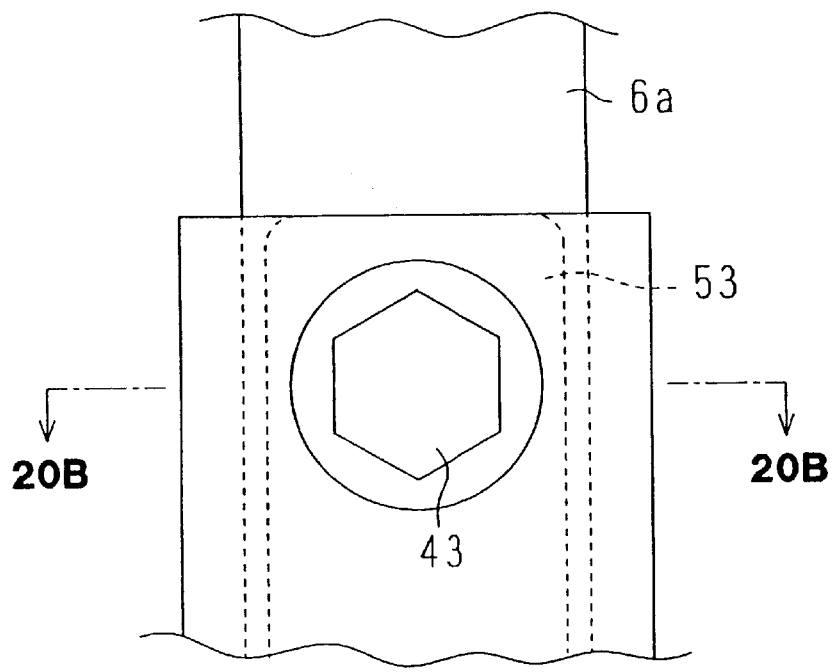
FIG. 20(a) is a partial view schematically showing the steering wheel as seen in the direction of arrow 20 in FIG. 16.
Figure 20B:
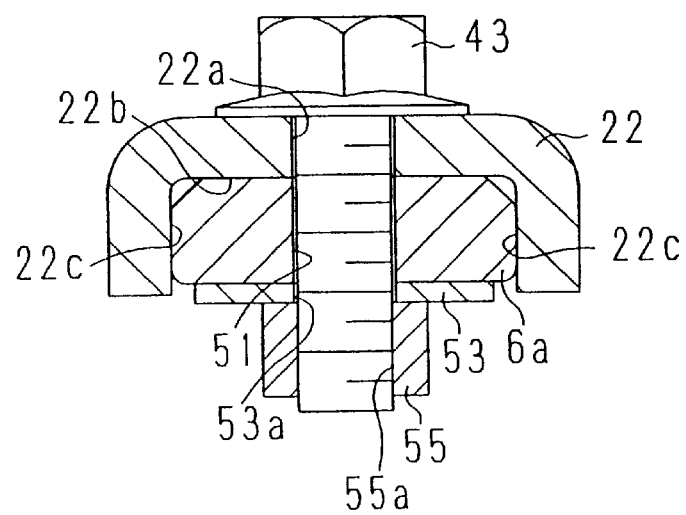
FIG. 20(b) is a cross-sectional view taken along line 20B—20B in FIG. 20(a)
Figure 22:
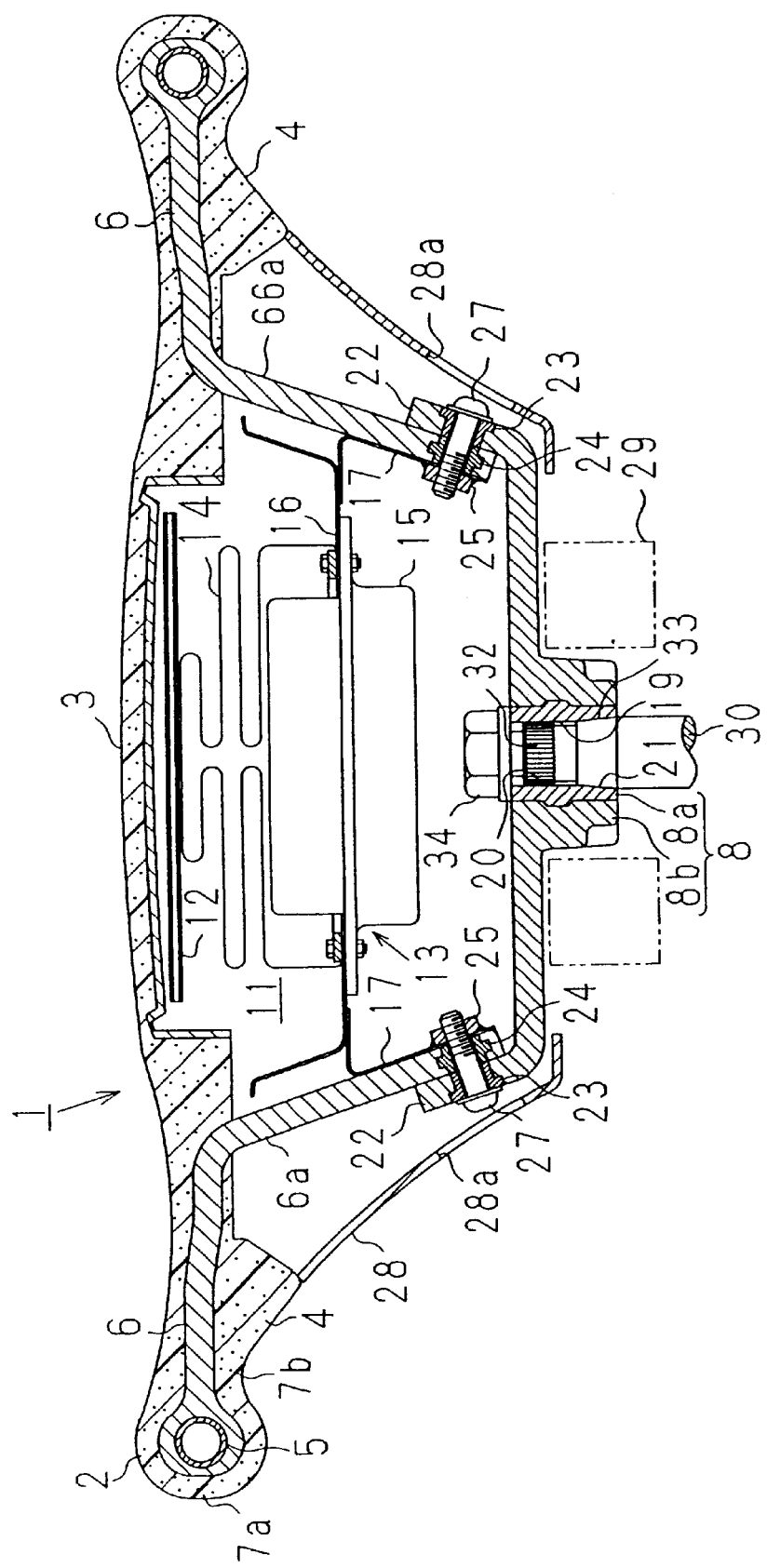
FIG. 22 is a cross-sectional view showing a further embodiment of a steering wheel according to the present invention.
Figure 23:
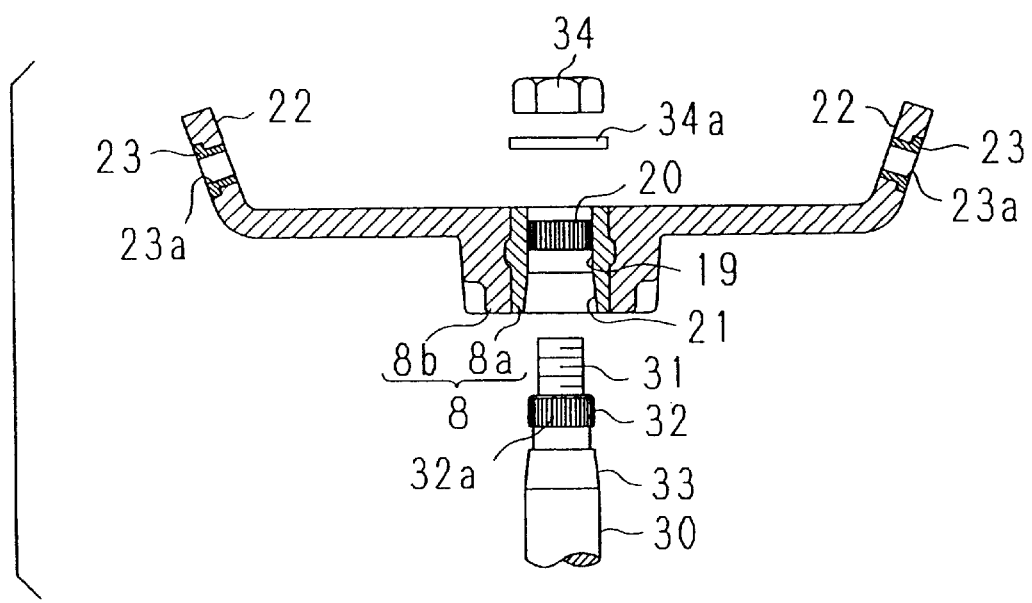
FIG. 23 is an exploded cross-sectional view showing the steering shaft and a boss plate of the steering wheel shown in FIG. 22.

As shown in FIGS. 17 to 19, a thin plate 52, which is made of an iron-based metal, is arranged on the flat portion 6g of the spoke core 6. Although the dimensions are smaller, the shape of the thin plate 52 is similar to that of the flat portion 6g. An oblique securing piece 53 extends upward from each side of the plate 52. A hole 52a, the diameter of which is equal to that of the hole 6b in the flat portion 6g, is defined in the center of the plate 52.

As shown in FIGS. 17 and 19, each securing piece 53 includes a hole 53a. A pair of threaded holes 54, which correspond to the through holes 6f, are defined in the plate 52. When the plate 52 is arranged overlapping the spoke core 6, the axis of each hole 53a coincides with the aligned axes of the corresponding through holes 22a, 51, and the axis of each threaded hole 54 coincides with the axis of the corresponding through hole 6f. The diameter of the holes 53a is equal to the diameters of the through holes 22a, 51.

A weld nut 55 concentric with the hole 53a is welded on the inner surface of each securing piece 53. A threaded portion 55a is defined in the weld nut 55. The securing pieces 53 and the weld nuts 55 are both made of an iron-based metal and securely fastened together through resistance welding. As shown in FIGS. 16 and 17, Y denotes a welded portion. With the corresponding weld nut 55 and through holes 51, 22 in an aligned state, a bolt 43 is screwed into the weld nut 55 to fasten together the plate 52, the spoke core 6, and the boss plate 8. In this embodiment, a bolt insertion hole is defined by the aligned through holes 22a, 51, 53a and threaded portion 55a.

As shown in FIGS. 17 to 20, to couple the spoke core 6 to the boss plate 8, the plate 52 is arranged overlapping the spoke core 6, and the spoke core 6 is arranged overlapping the boss plate 8. Each bolt 43 is inserted through the aligned through holes 22a, 51, 53a from the outer side of the steering wheel and screwed into the threaded portion 55a of the associated weld nut 43. This completes the coupling of the spoke core 6 to the boss plate 8.

The advantageous effects described below may be obtained from the embodiment of FIGS. 15–20.

(a) In the same manner as the preceding embodiments, displacement of the various members in the bolt fastening portion is eliminated. This improves dimensional accuracy and enhances rigidity.

(b) If the spoke core 6 is made of an alloy having a low degree of hardness, the stress produced when fastening each bolt 43 is prevented from concentrating at the associated weld nut 25 and received by the entire plate 52. Accordingly, the weld nut 55 need not be arranged in each through hole 51 by way of a member having a high degree of hardness to prevent deterioration about the periphery of the hole 51. This reduces the number of parts in the bolt fastening portion and facilitates production.

A further modified form of the embodiment of FIGS. 8–13 is shown in FIG. 21. A fitting projection 61 projects from the bottom surface of each of the three projections 6c. The diameter of the fitting projection 61 is smaller than that of the associated projection 6c. Through holes 62 corresponding to the fitting projections are provided in the plate portion 8b of the boss plate 8. When coupling the spoke core 6 to the boss plate 8, the fitting projections 61 are fitted into the associated through holes 62. This structure further firmly prevents displacement of the spoke core 6 with respect to the boss plate 8. Accordingly, this structure further prevents the spoke core 6 from being loosely held by the boss plate 8.

The structure shown in FIG. 21 may also be applied to the embodiment of FIGS. 15–20. Furthermore, the through holes 62 may be replaced by recesses.

The procedures for mounting the steering wheel W on the steering shaft 30 will now be described with reference to FIGS. 3, 13, and 37.

As shown in FIG. 3, the boss plate 8 is fitted to the distal end of the steering shaft 30. The splined portion 32 of the steering shaft 30 is meshed with the splined portion 20 defined on the wall of the hole 19 extending through the boss plate 8. In this state, the nut 34 is fastened to the threaded portion 31 of the steering shaft 30 to secure the boss plate 8 to the steering shaft 30.

The cover 28 is then arranged so as to cover the lower side of the boss plate 8. The boss plate 8 is provided with holes 22e. Threaded bores 28b are provided in the cover 28 in correspondence with the holes 22e. A bolt 28a is inserted through each hole 22e and fastened to the associated threaded bore 28b to secure the cover 28 to the boss plate 8.

The assembled steering wheel body 1 (including the membrane switch 12 and the air bag apparatus 13) is then placed on the boss plate 8. As shown in FIG. 37, the connecting portions 6a and the flat portion 6g of the spoke core 6 are positioned by the plate portion 8b of the boss plate 8 (including the connecting pieces 22). The collars 42 are fitted to the associated through hole 41 before mounting the body 1.

The cover 28 is already secured to the boss plate 8 when arranging the spoke core 6 on the boss plate 8. Thus, the cover 28 guides the spoke core 6 toward the plate portion 8b of the boss plate 8. This facilitates the positioning of the spoke core 6.

During the positioning of the spoke core 6, the three projections 6c projecting from the lower surface of the flat portion 6g abut against the upper surface of the plate portion 8b. Furthermore, the fitting projections 61 are fitted into the associated through holes 62, and the extended portions 6e are fitted securely to the inner side of the boss plate 8. This holds the spoke core 6 firmly and prevents the spoke core 6 from becoming loose.

The bolts 43 are then inserted through each through hole 22a of the connecting pieces 22 and fastened to the threaded portion 42c of the associated collar 42. The lower end of the restricting portion 42b of each collar 42 abuts against the upper end of the associated projection 6d and prevents the collar 42 from rotating. When fastening the spoke core 6 to the connecting pieces 22 with the bolts 43, the lower surfaces of the projections 6c are pressed against the boss plate 8. This significantly restricts loosening of the spoke core 6.

As shown in FIG. 13(b), the surface of each collar 42 opposite to the restricting portion 42b and the outer surface of the connecting portions 6a abut against the inner surface 22c of the associated connecting pieces 22. This further significantly restricts loosening of the spoke core 6.

Figure 37:
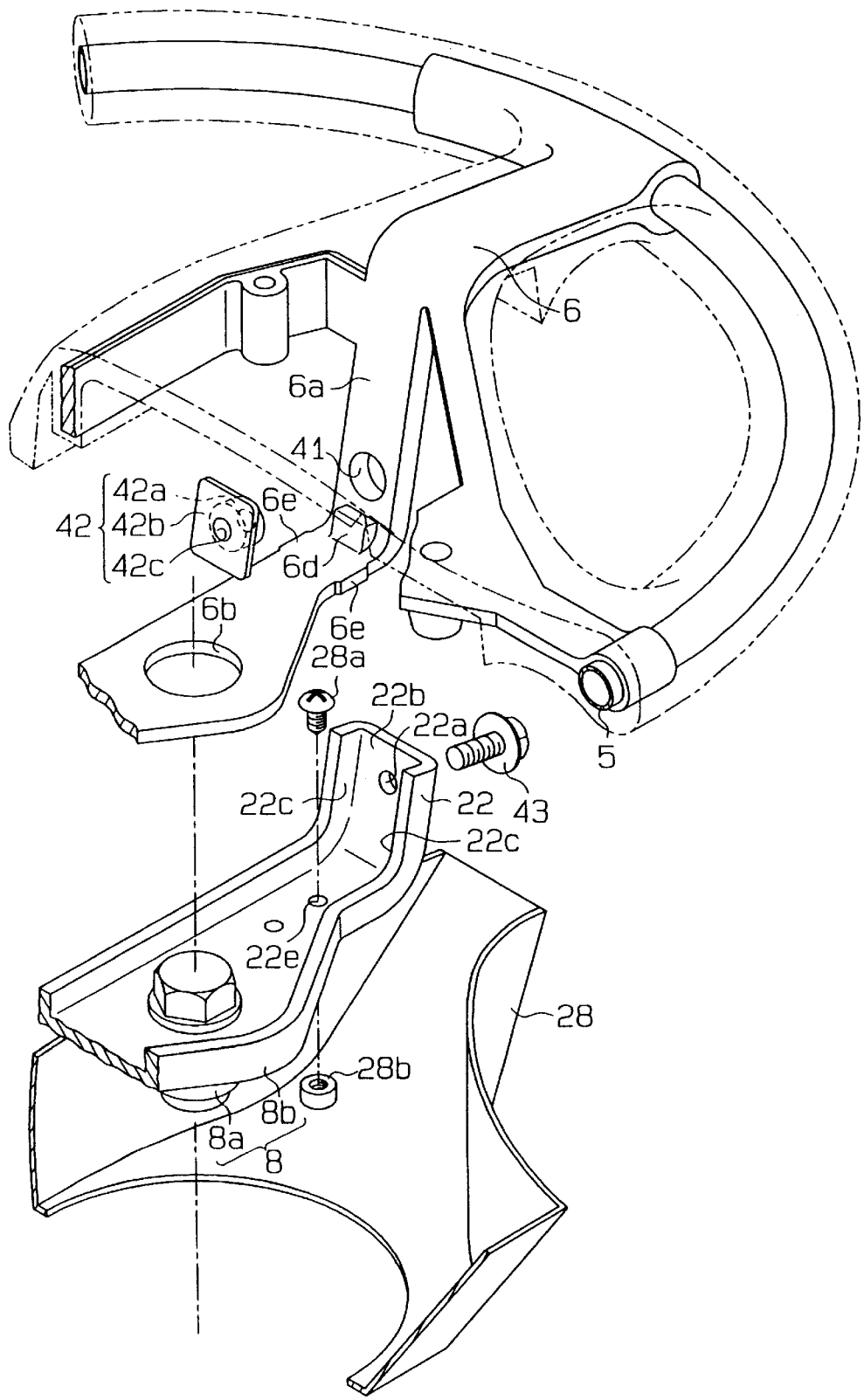
FIG. 37 is an exploded perspective view showing the steering wheel of FIG. 21.

In the embodiment of FIGS. 21 and 37, among the three radial portions of the spoke core 6, the two opposed radial portions of the spoke core 6 are connected by the connecting portions 6a. Furthermore, the flat portion 6g and the connecting portions 6a of the spoke core 6 are arranged on the boss plate 8 and fastened to the boss plate 8 by bolts 43. The bolts 43 fasten the spoke core 6 to the boss plate 8 at two positions, that is, at the two radial portions. In this manner, the connecting pieces 6a give the ring core 5 and the spoke core 6 an integral structure. The integral structure enhances the rigidity of the entire steering wheel W. Since the connecting portions 6a and the flat portion 6g are supported by the boss plate 8, the steering wheel W is held in a stable state. Therefore, even if the steering wheel W has three spokes 4, the steering wheel W may be firmly mounted by fastening at only two positions. This improves the assembling efficiency of the steering wheel W.

When assembling the steering wheel W, the boss plate 8 is secured to the steering shaft 30 and the cover 28 is attached to the boss plate 8. Afterwards, the steering wheel body 1 is placed on the boss plate 8. Thus, when positioning the steering wheel body 1, the body 1 is supported by the cover 28 in addition to the boss plate 8. This supports the steering wheel body 1 in a stable state and prevents the body 1 from falling down and causing unnecessary delays when mounting the steering wheel W to the steering shaft 30.

Furthermore, the cover 28 guides the spoke core 6 toward the plate portion 8b of the boss plate 8. This facilitates the positioning of the spoke core 6 with respect to the boss plate 8 and further improves mounting efficiency.

In the embodiment of FIGS. 21 and 37, the two radial portions of the spoke core 6 have an integral structure. This suppresses displacement of the bolt insertion holes of the spoke core 6 and permits accurate fastening by the bolts at the fastening portions. Furthermore, this enhances the rigidity of the core structure, which includes the ring 2 and the spokes 4 and improves the strength of the entire steering wheel W.

In the embodiment of FIGS. 21 and 37, the bolt insertions holes include the through holes 22a provided in the connecting pieces 22 of the boss plate 8 and the threaded portion 42c of the collars 42. Accordingly, fastening of bolts is carried out from beside the steering wheel W and not from below the steering wheel W. This further improves assembling efficiency.

The abutment of the projections 6c against the boss plate 8 restricts loosening of the spoke core 6 in the boss plate 8. This causes the steering wheel W to be firmly mounted on the steering shaft 30. Furthermore, the fitting projections 61 projecting from the projections 6c are fit into the associated through holes 62 of the plate portion 8b. This facilitates the positioning of the spoke core 6 and further suppresses loosening of the spoke core 6 in the boss plate 8.

A further embodiment of a steering wheel according to the present invention will hereafter be described with reference to FIGS. 22 to 25. In this embodiment, the structure of the spoke core differs from the preceding embodiments. More specifically, a spoke core 66a is provided independently for each spoke 4. Thus, the flat portion 6g, shown in FIG. 2, is not included in this embodiment. Each spoke core 66a is generally L-shaped and die casted from a light metal such as aluminum alloy. The outer end of each spoke core 66a is connected to the ring core 5 while the inner end of each core 66a is connected to the associated connecting piece 22 of the boss plate 8.

Bolt inserts 23, 24, which are made of an iron-based metal, are embedded in the connecting piece 22 and the inner end of the associated spoke core 66a. A weld nut 25 is welded and fixed to each support arm 17 of the bag holder 16. As apparent when comparing FIGS. 25 and 6, the structure for mounting the steering wheel to the steering shaft 30 is the same as that of the first embodiment.

Figure 24:
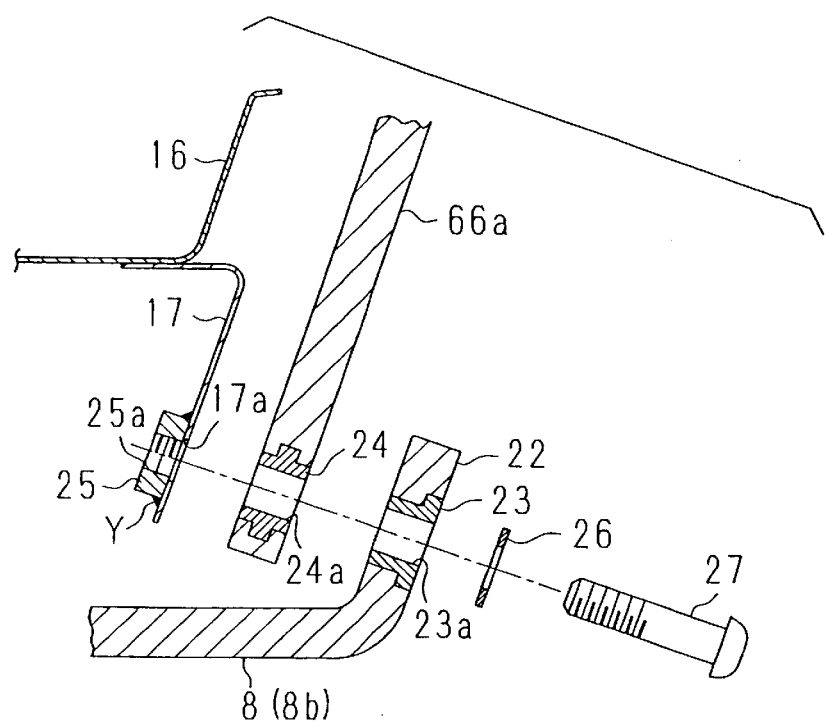
FIG. 24 is a partial exploded cross-sectional view showing the fastened portions of spoke cores and a boss plate.
Figure 25:
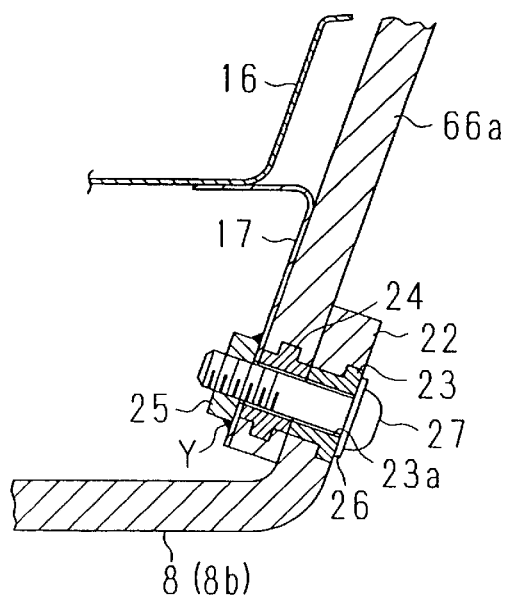
FIG. 25 is a partial cross-sectional view showing the spoke cores and the boss plate of FIG. 24 in a fastened state.

As shown in FIGS. 24 and 25, to couple each spoke core 66a to the boss plate 8, the inner end of the spoke core 66a is arranged at the inner side of the associated connecting piece 22. Each support arm 17 is arranged at the inner side of the associated connecting piece 22. The axes of the cooperating bolt inserts 23, 24 and weld nut 25 are aligned with one another. In this state, the bolt 27 is inserted through the through holes 23a, 24a by way of the washer 26 from the outer side of the connecting piece 22. The bolt 27 is then screwed into the threaded portion 25a of the weld nut 25 to firmly fasten the spoke core 66a to the boss plate 8.

In this embodiment, each spoke core 66a is coupled to the associated connecting piece 22 with the bolt inserts 23, 24, which are made of an iron-based metal, contacting each other. This prevents plastic deformation and fatigue of the spoke cores 66a and the connecting pieces 22. Accordingly, a light and rigid steering wheel is produced. The advantageous effects of the preceding embodiments may also be obtained in this embodiment.

Figure 26:
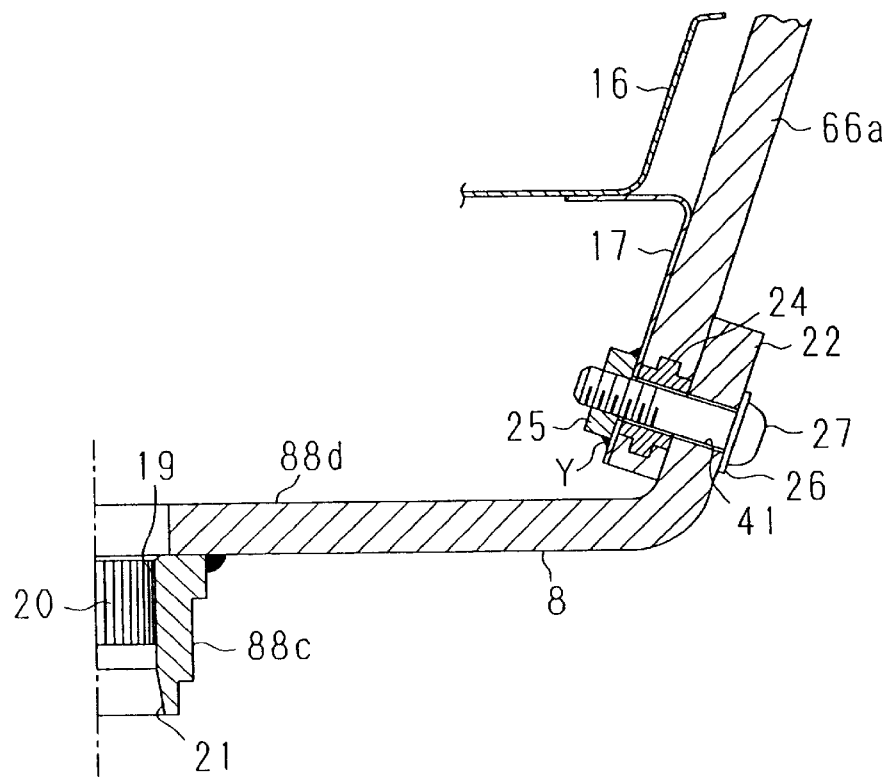
FIG. 26 is a partial cross-sectional view showing a further embodiment of a steering wheel according to the present invention with spoke cores and a boss plate in a fastened state.

A further embodiment of a steering wheel according to the present invention will hereafter be described with reference to FIG. 26. This embodiment is a combination of the spoke core coupling structure employed in the embodiment of FIG. 25 and the steering shaft mounting structure employed in the first embodiment (FIG. 2). As shown in FIG. 26, the boss plate 8 includes a plate portion 88d, which is formed by pressing a steel plate, and a steel cylindrical portion 88c, which is welded and fixed to the plate portion 88d. The advantageous effects of the first embodiment and the embodiments of FIGS. 22–25 are obtained in this embodiment.

Figure 27:
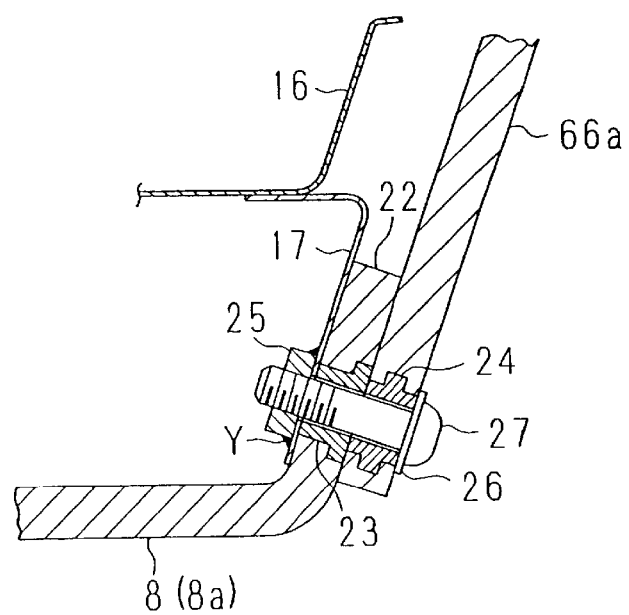
FIG. 27 is a partial cross-sectional view showing a further embodiment of a steering wheel according to the present invention with the spoke cores and the boss plate in a fastened state.

A further embodiment of a steering wheel according to the present invention will hereafter be described with reference to FIG. 27. This embodiment differs from the embodiment of FIGS. 22–25 in that each spoke core 66a is arranged at the outer side of the associated connecting piece 22. However, in the same manner as the embodiment of FIGS. 22–25, when the spoke cores 66a are coupled to the associated connecting pieces 22, the bolt inserts 23, 24 contact each other. Accordingly, the advantageous effects of the embodiment of FIGS. 22–25 are obtained in this embodiment.

Figure 28:
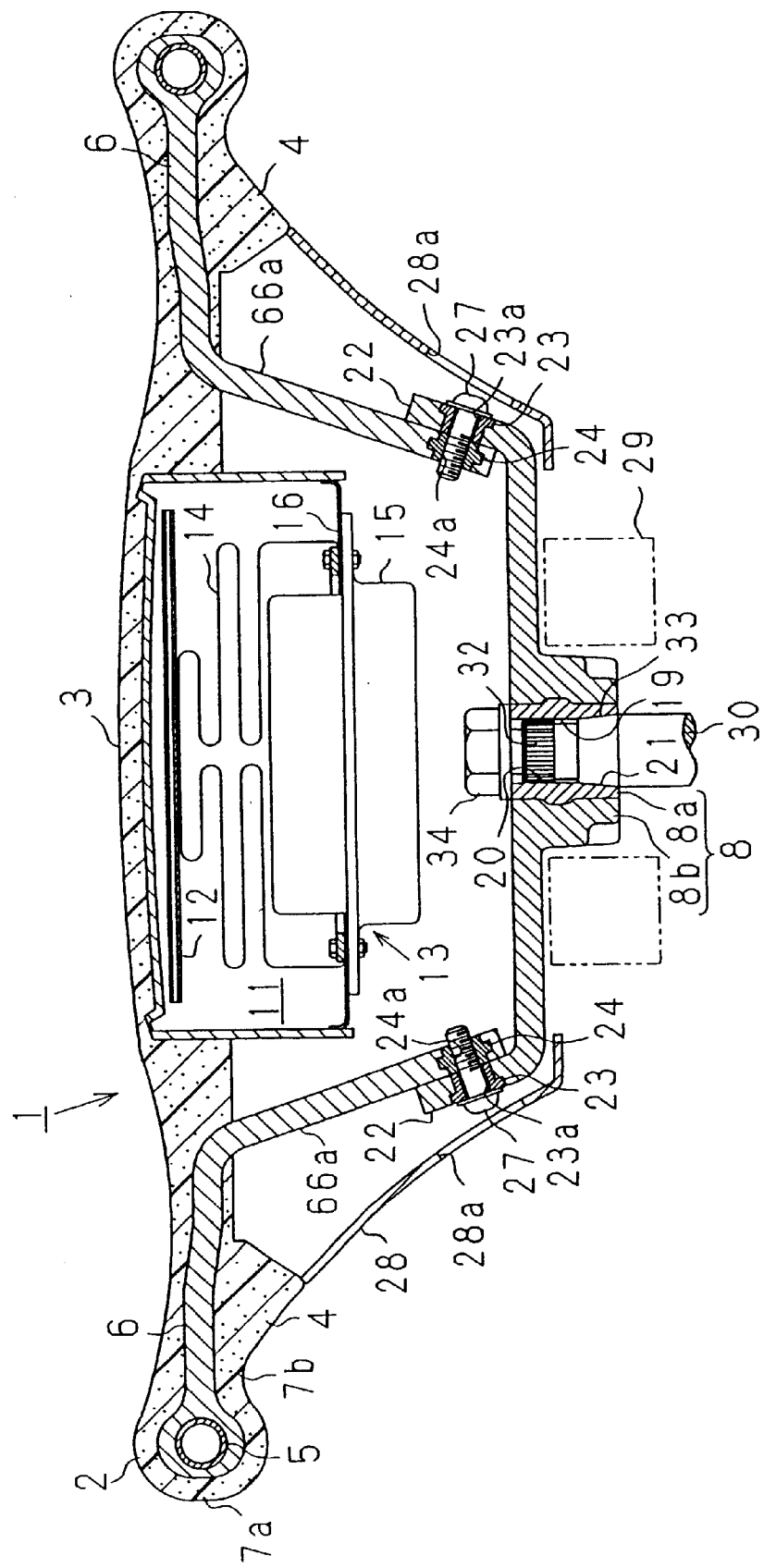
FIG. 28 is a cross-sectional view showing a further embodiment of a steering wheel according to the present invention.

Another embodiment of a steering wheel according to the present invention is shown in FIG. 28. In this embodiment, the structure coupling each spoke core to the boss plate differs from the embodiment of FIG. 22. A threaded portion 24a is defined in the bolt insert 24, which is embedded in the inner end of each spoke core 66a. The support arms and the weld nuts coupled thereto are not used in this embodiment.

Figure 29:
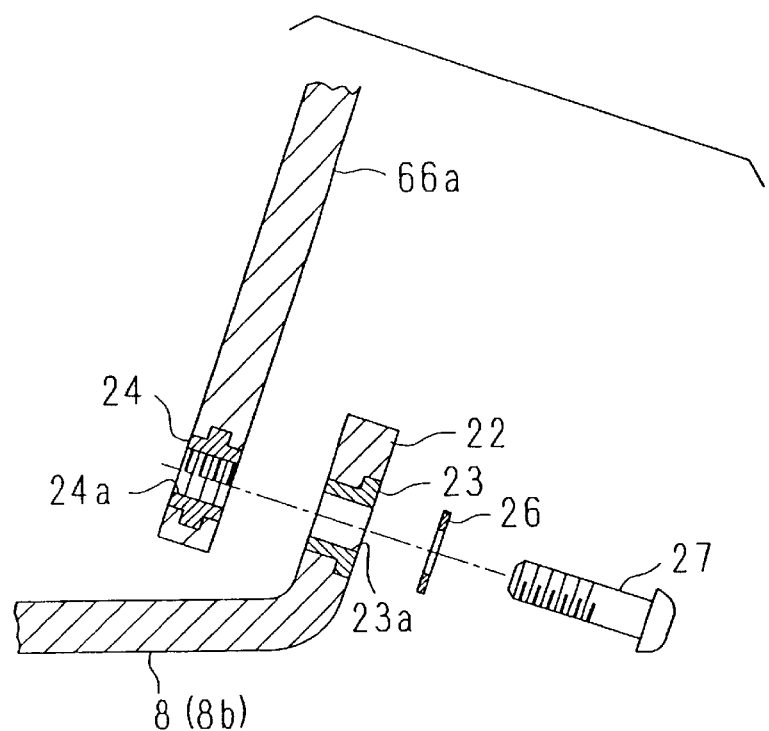
FIG. 29 is a partial exploded cross-sectional view showing the fastened portion of spoke cores and a boss plate of the steering wheel of FIG. 28.
Figure 30:
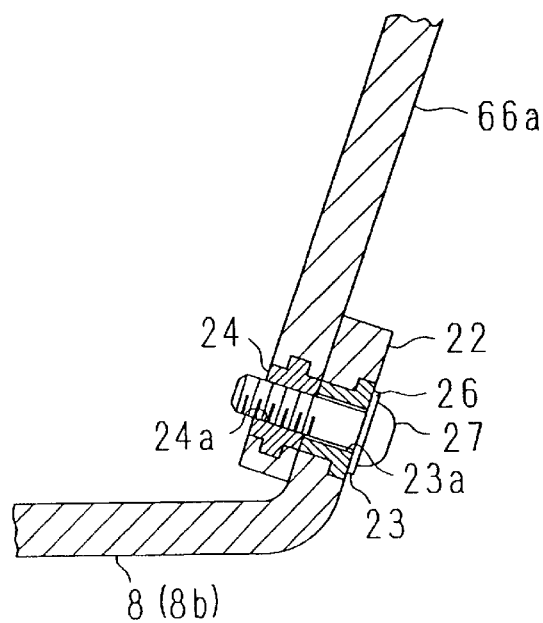
FIG. 30 is a cross-sectional view showing the spoke cores and the boss plate of FIG. 29 in a fastened state.

As shown in FIGS. 29 and 30, the inner ends of the spoke cores 66a are arranged at the inner sides of the associated connecting pieces 22 to couple the spoke cores 66a to the boss plate 8. The axes of the cooperating bolt inserts 23, 24 are aligned with each other. In this state, the bolts 27 are inserted through the through holes 23a and screwed into the threaded portion 24a of the associated bolt insert 24. This firmly fastens the spoke cores 66a to the boss plate 8.

The advantageous effects of the embodiment of FIGS. 22–25 are also obtained in this embodiment. Furthermore, since the weld nuts are not used, the number of required parts is reduced.

Figure 31:
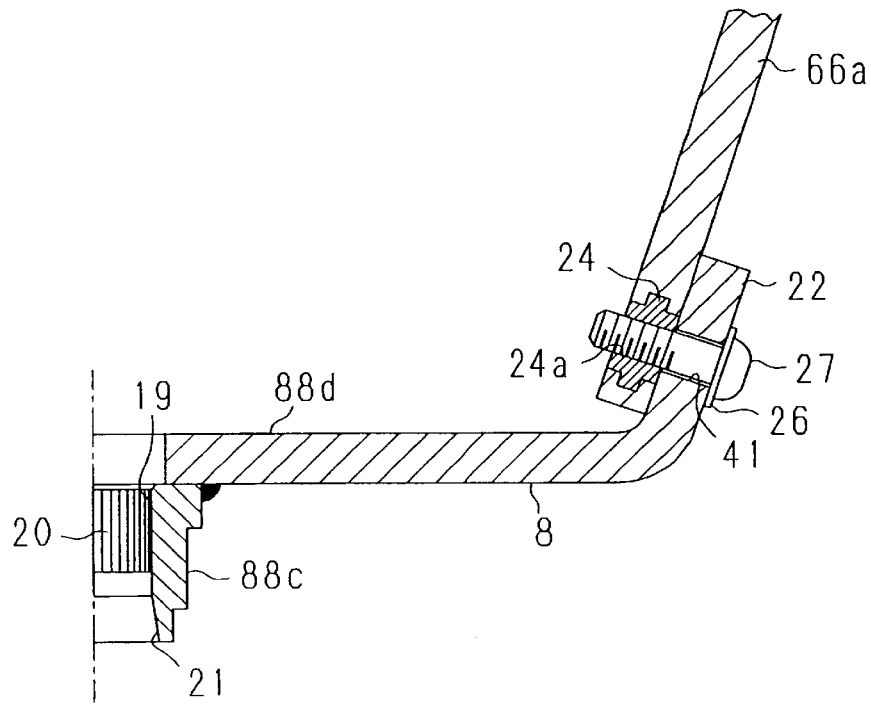
FIG. 31 is a partial cross-sectional view showing a further embodiment of a steering wheel according to the present invention with spoke cores and a boss plate in a fastened state.

A further embodiment of a steering wheel according to the present invention is shown in FIG. 31. This embodiment is a combination of the coupling structure of the spoke cores 66a employed in the embodiment of FIG. 28 and the mounting structure of the steering shaft employed in the embodiment of FIG. 26. Accordingly, the advantageous effects of the embodiments of FIGS. 26 and 28 are also obtained in this embodiment.

Figure 32:
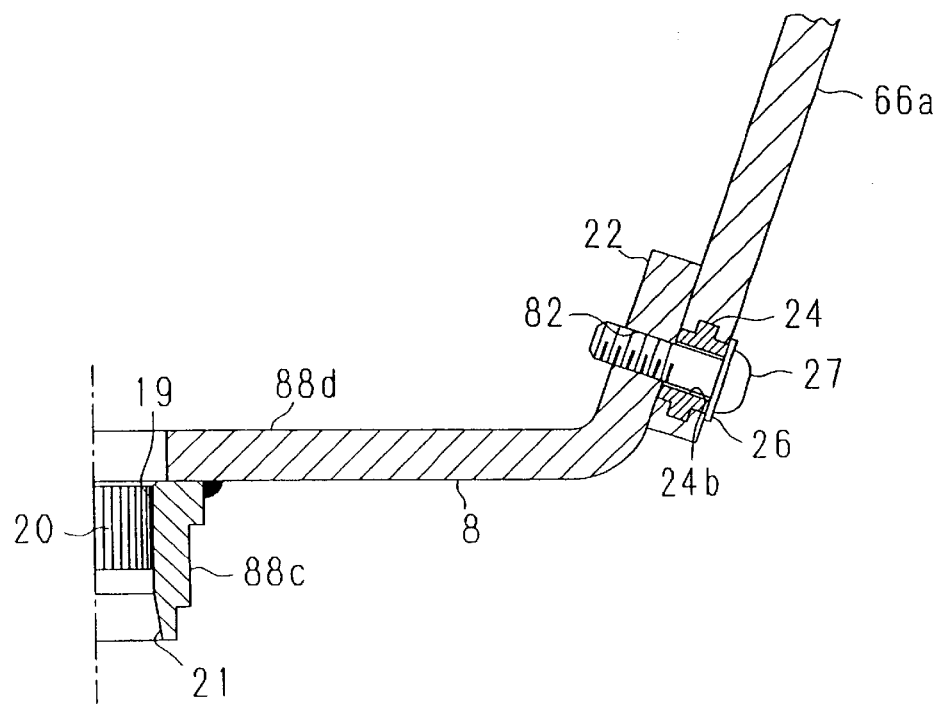
FIG. 32 is a partial cross-sectional view showing a further embodiment of a steering wheel according to the present invention with spoke cores and a boss plate in a fastened state.

A further embodiment of a steering wheel according to the present invention is shown in FIG. 32. This embodiment differs from the embodiment of FIG. 31 in that the spoke cores 66a are arranged at the outer side of the corresponding connecting pieces 22, and that the bolts 27 are screwed into associated threaded holes 82, which are directly defined in the connecting pieces 22. This structure also allows contact between corresponding iron-based metals at the connecting portions of the spoke cores 66a and the associated connecting pieces 22. Thus, the desired objectives are achieved through this structure.

Figure 33:
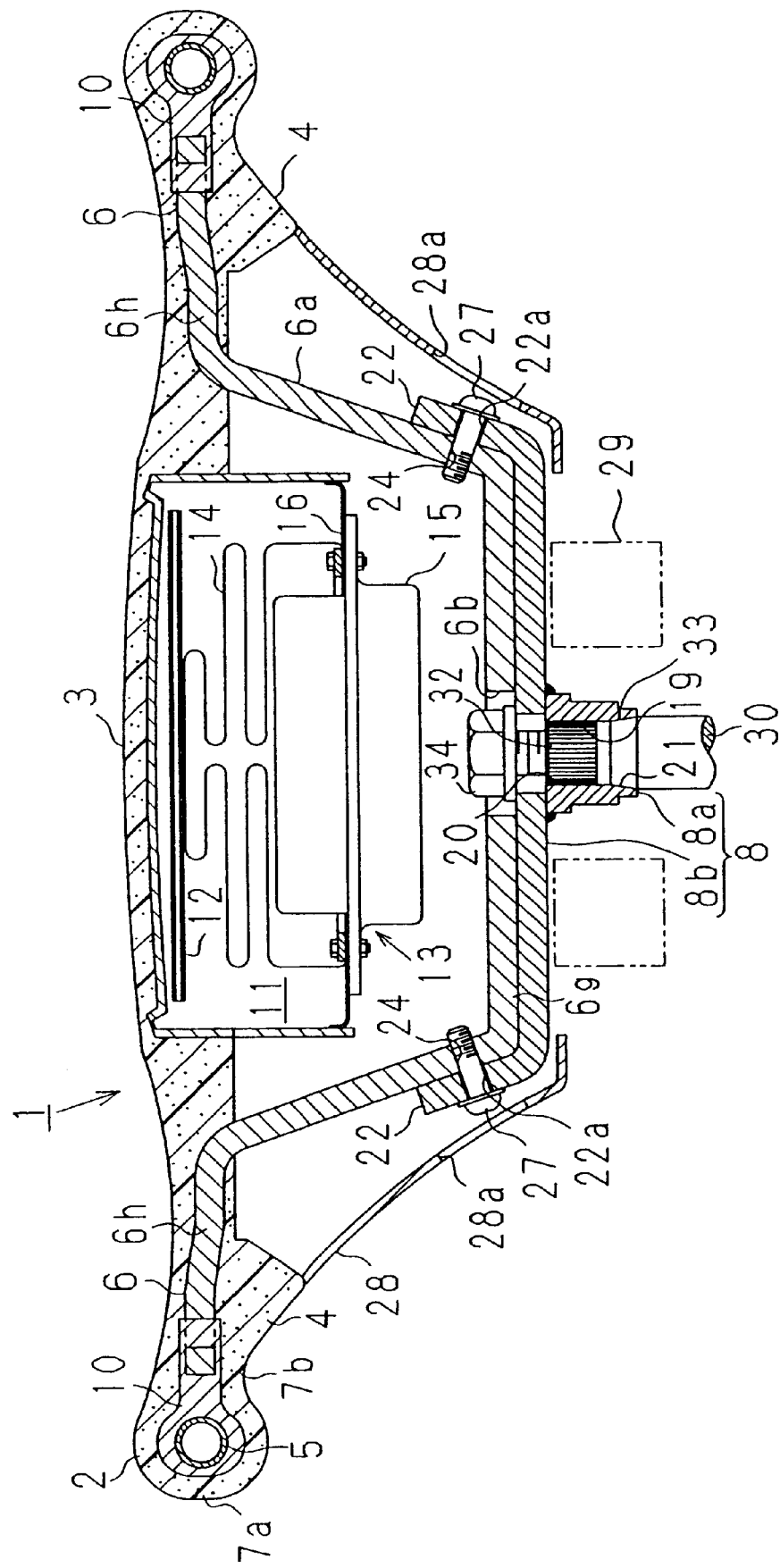
FIG. 33 is a cross-sectional view showing a further embodiment of a steering wheel according to the present invention.
Figure 34:
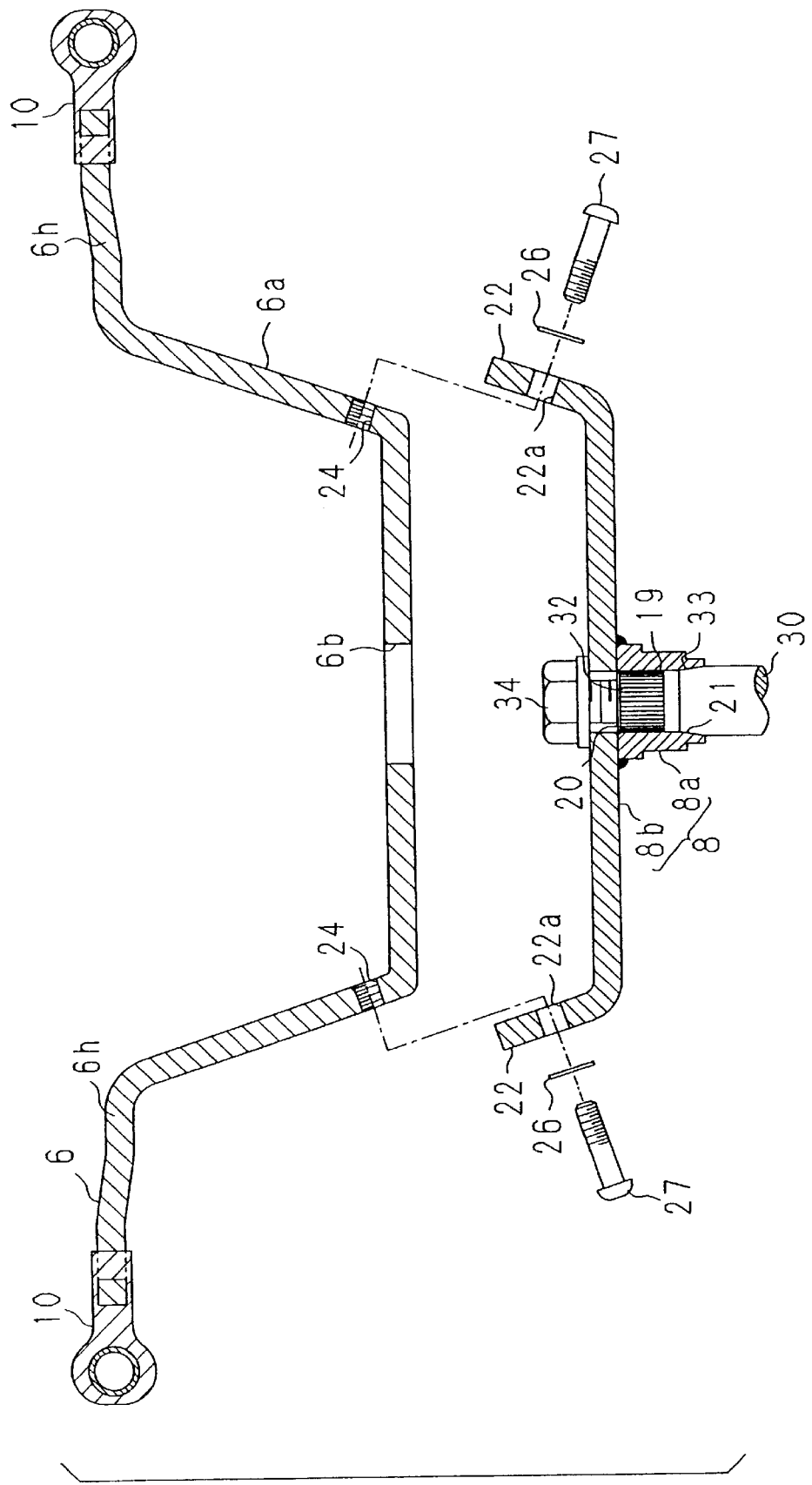
FIG. 34 is an exploded cross-sectional view showing spoke cores and a boss plate in the steering wheel of FIG. 33.

A further embodiment of a steering wheel according to the present invention is shown in FIGS. 33 and 34. In this embodiment, the structure coupling the spoke core 6 to the ring core 5, and the structure coupling the spoke core 6 to the boss plate 8 differs from the first embodiment (FIG. 2).

In this embodiment, the spoke core 6 is made of an iron-based material. The spoke core 6 includes the flat portion 6g, which is arranged overlapping the boss plate 8, a plurality of radial portions 6h extending toward the center of the steering wheel from the vicinity of the ring core 5, and the oblique connecting portions 6a, which extend downward from each radial portion 6h and are connected integrally with the flat portion 6g below the pad 3.

The outer end of each radial portion 6h is coupled to the ring core 5 by a joint 10, which is die casted from aluminum. A threaded hole 24 is defined near the lower end of each connecting portion 6a. A through hole 22a is defined in the corresponding connecting piece 22. A bolt 27 is inserted through the through hole 22a of each connecting piece 22 by way of the washer 26 and screwed into the threaded hole 24. This couples the spoke core 6 to the boss plate 8.

To couple the spoke core 6 to the boss plate 8, each radial portion 6h is connected to the ring core by the associated joint 10. In this state, the spoke core 6 is placed on the boss plate 8. By screwing the bolts 27 into the threaded holes 24, the coupling of the spoke core 6 to the boss plate 8 is completed. Accordingly, the advantageous effects of this embodiment are substantially the same as those of the first embodiment.

Figure 35:
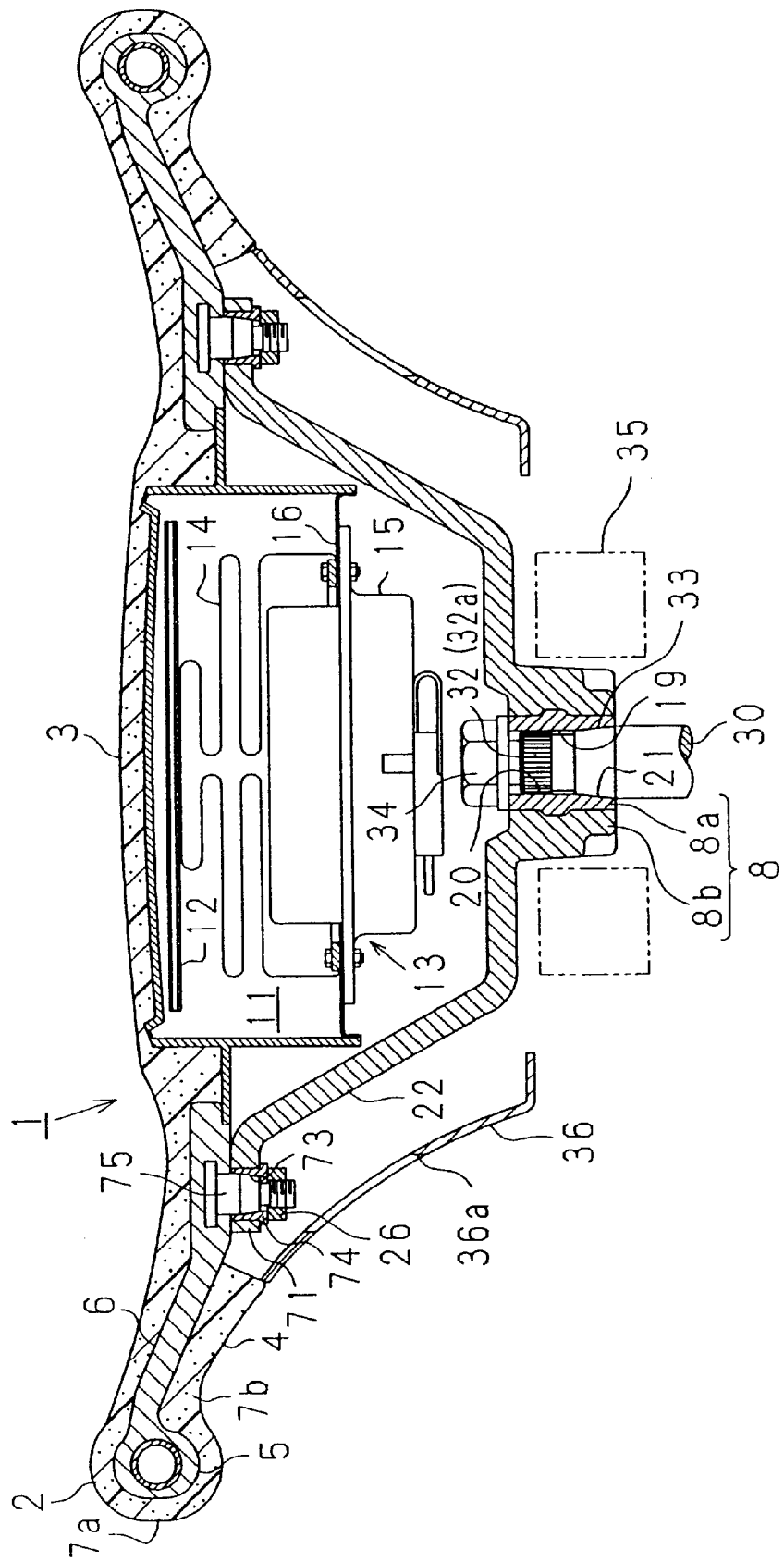
FIG. 35 is a cross-sectional view showing a further embodiment of a steering wheel according to the present invention.
Figure 36:
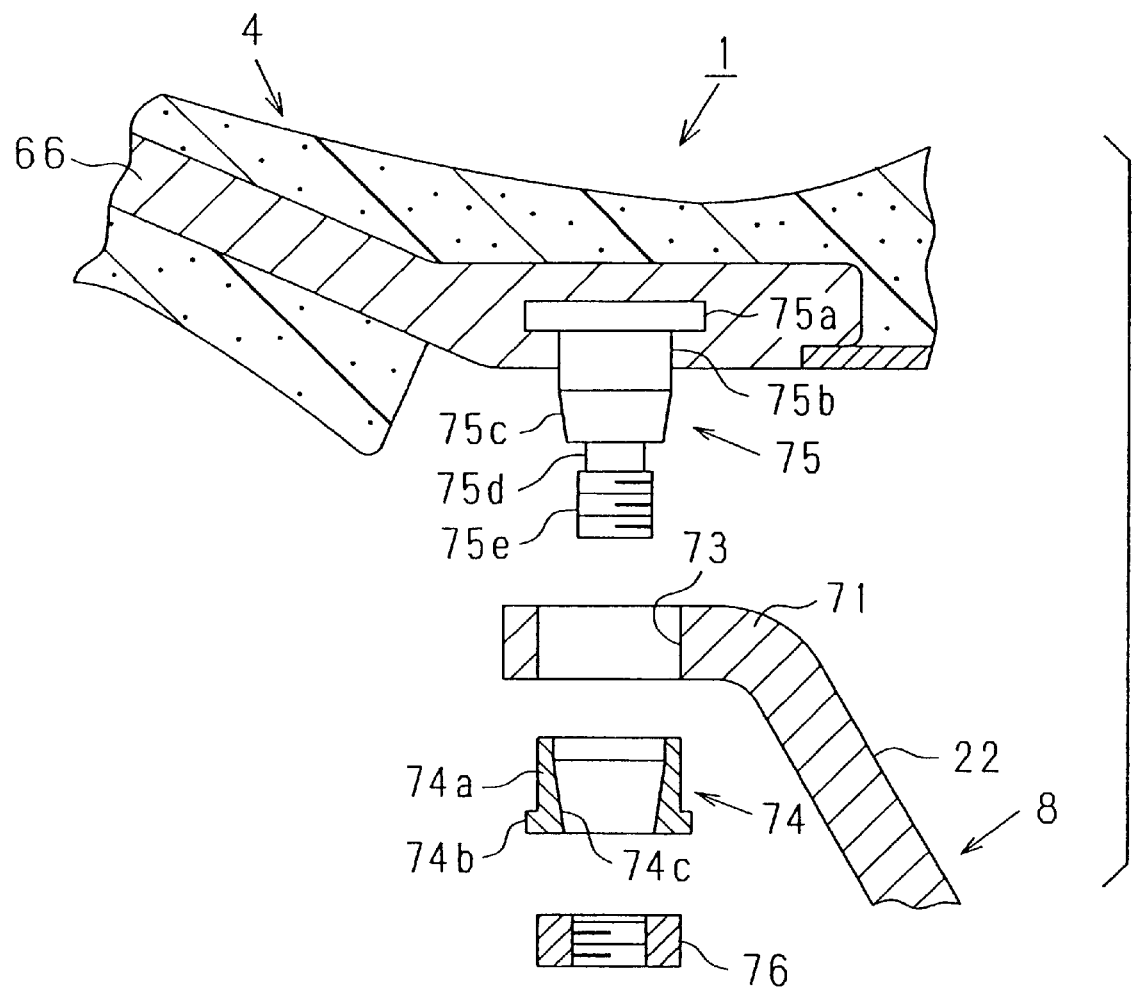
FIG. 36 is an enlarged, exploded cross-sectional view showing part of the steering wheel of FIG. 35.

A further embodiment of a steering wheel according to the present invention is shown in FIGS. 35 and 36. In this embodiment, the structure coupling the spoke core to the boss plate differs from the second embodiment (FIG. 6).

Substantially, the entire portion of the boss plate 8 is die casted from aluminum. The boss plate 22 includes the pair of connecting pieces 22. Each connecting piece 22 extends upward to the vicinity of the pad 3.

Each spoke core 66 is constituted only by a radial portion, which extends parallel to the pad 3 between the pad 3 and the ring core 5. One end of each spoke core 66 is coupled to the ring core 5 while the other end is coupled to the corresponding connecting piece 22 of the boss plate 8.

The structure for coupling the spoke cores 66 to the boss plate 8 will now be described. A mounting portion 71, which extends substantially parallel to the pad 3, is defined on the upper end of each connecting piece 22. Each mounting portion 71 includes a through hole 73 extending parallel to the steering shaft 30. A steel collar 74 is fit into the through hole 73. The collar 74 is cylindrical and provided with a flange 74b at its lower end. The collar 74 is also provided with an opening 74c, the diameter of which becomes larger as it approaches the upper end of the collar 74.

A taper bolt 75 is fixed to the inner end of each spoke core 66. A large diameter portion 75a, a medium diameter portion 75b, a tapered portion 75c, a small diameter portion 75d, and a threaded portion 75e are defined in the taper bolt 75. The large diameter portion 75c and part of the medium diameter portion 75b are embedded in the spoke core 66 when die casting the core 66. The tapered portion 75c and the threaded portion 75e are exposed extending downward from the spoke core 66.

To couple the spoke cores 66 to the boss plate 8, the body 1 is arranged over the boss plate 8. The tapered portion 75c and the threaded portion 75e of each taper bolt 75 are then inserted into the opening 74c of the associated collar 74. Since the inner diameter of the opening 74c is larger at its upper part, and the taper bolt 75 has a tapered portion 75c, which shape corresponds to the opening 74c, the inserting procedure of the bolt 75 may easily be carried out. A nut 76 is then screwed onto the threaded portion 75e of the taper bolt 75 from the lower side of the pad 3. Accordingly, the connecting pieces 22 are easily connected to the associated spoke cores 66.

The connecting pieces 22 may be made of an iron-based metal in the same manner as the first embodiment. In this case, the opening 74c is provided directly in each connecting piece 22.

Although several embodiments of the present invention have been described herein, it should be apparent to those skilled in the art that the present invention may be embodied in many other specific forms without departing from the spirit or scope of the invention. Particularly, it should be understood that the present invention may also be embodied in the forms described below.

(1) The material of the spoke core 6 is not limited to aluminum alloys. Other light metals, such as magnesium, may be used in lieu of aluminum alloys. Iron-based metals are used as the material for various members in the present invention. Such metals include hot rolled mild steel sheet (as classified in Japanese Industrial Standard (JIS) G3131), cold rolled steel sheet (as classified in JIS G3141), and electrolytic zinc-coated carbon steel sheet (as classified in JIS G3313).

(2) A box-like impact absorbing member may substitute for the air bag apparatus 13 shown in FIG. 2. In this case, each support arm 17 is fixed to the impact absorbing member.

Figure 15:
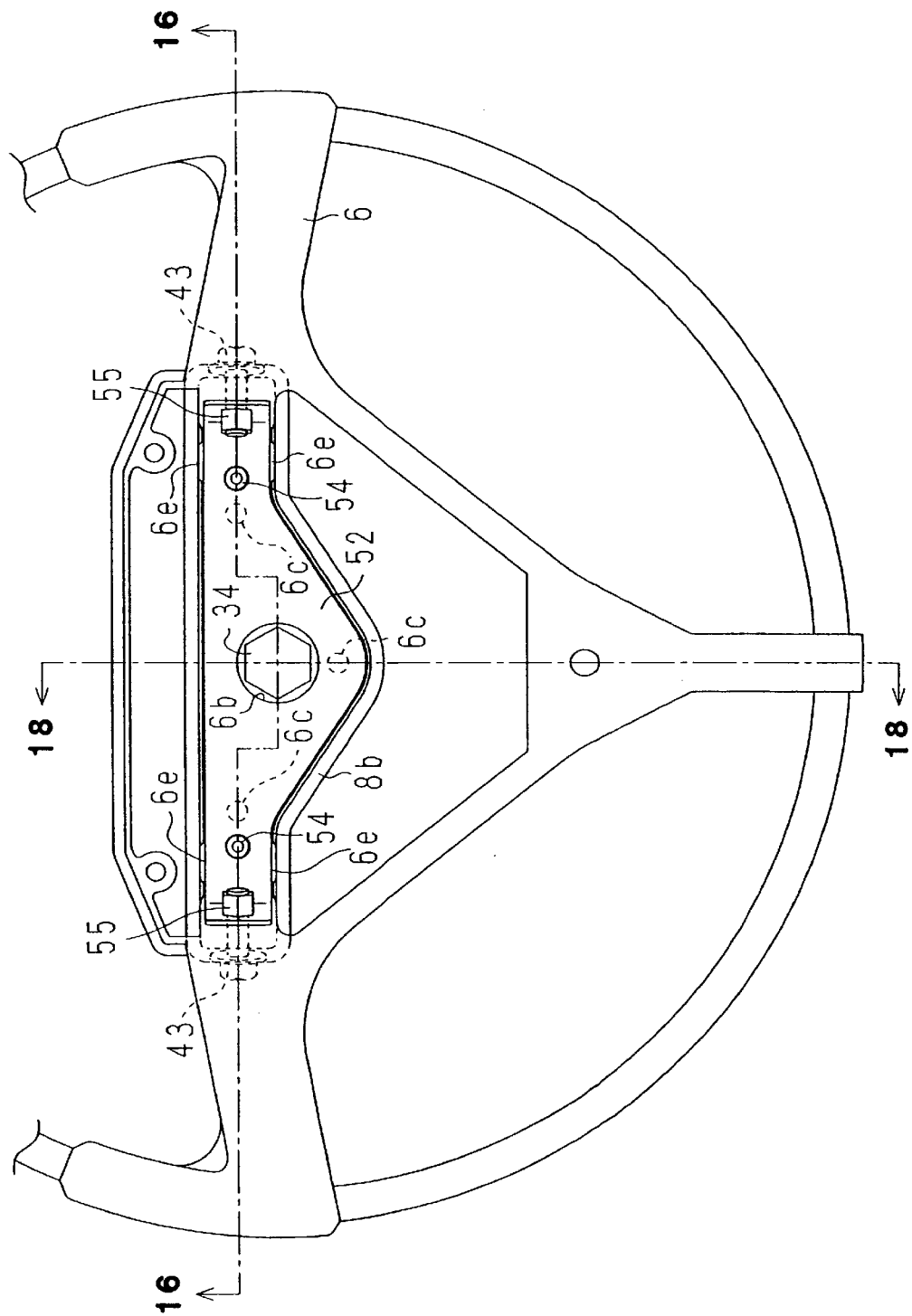

(3) In the embodiments of FIGS. 2, 8, and 15, the boss plate 8 is constituted by the cylindrical portion 8a and the plate portion 8b, which are made of steel. However, the plate portion 8b may be made of a light metal, such as aluminum, while the cylindrical portion 8a is made of steel. This contributes to the production of a light steering wheel. In this case, it is desirable that a bolt insert made of a metal-based steel be arranged in the bolt fastening portion of each connecting piece 22. This reduces fatigue and deformation of the portion made of a light metal.

(4) In the first embodiment shown in FIG. 2, the bolt insert 24 may be eliminated if the material used to form the spoke core 6 counters deformation and deterioration caused by the fastening force of the bolts 27. This structure prevents stress, which is produced when fastening the bolts 27, from concentrating at the weld nut 25 and allows the stress to be received entirely by each support arm 17. Accordingly, deterioration of the connecting portion 6a, which is caused by the fastening of the bolts 27, is prevented. This structure decreases the number of parts used in the bolt fastening portion and facilitates the production of the steering wheel.

(5) In the second embodiment shown in FIG. 6, the entire boss plate 8 may be made of steel. In this case, the bolt inserts 23 may be eliminated.

(6) In the embodiment shown in FIG. 16, cylindrical bolt inserts made of an iron-based metal may be arranged in the connecting portions 6a of the spoke core 6. Accordingly, in case the alloy employed to form the spoke core 6 has a low degree of hardness, this structure prevents deterioration of the connecting portions 6a caused by stress, which is applied by the fastening of the bolts 27. This allows the production of a light steering wheel and reduces material costs.

(7) In the embodiments shown in FIGS. 2 and 6, the bolts 27 are formed independently from the washers. Thus, it is necessary to fit the washers 26 onto the bolts 27 during the bolt fastening procedure. In comparison, the bolts 43 in the embodiments shown in FIGS. 9 and 16 are provided with integral washers. Therefore, separate washers need not be used during the bolt fastening procedure.

The bolts 27 and the washers 26 employed in the embodiments of FIGS. 2 and 6 may substitute for the bolts 43, which are provided with integral washers and employed in the embodiments of FIGS. 9 and 16. Contrarily, the bolts 43 provided with integral washers 43 may substitute for the bolts 27 and washers 26 employed in the first and second embodiments.

(8) In addition to three-spoke type steering wheels, the present invention may be embodied in other steering wheels, such as two-spoke type, four-spoke type, and other type of steering wheels. Furthermore, the number of bolt connecting portions provided between the spoke core and the boss plate may be more than two.

(9) In the first and second embodiments shown in FIGS. 2 and 6, the flat portion 6g may be provided with the projections 6c that are similar to those employed in the embodiments of FIGS. 9 and 16. Furthermore, the structure described in paragraph (8) may also be applied to the embodiments of FIGS. 9 and 16. The projections 6c employed in the embodiments of FIGS. 9 and 16 may also be eliminated so that the entire bottom surface of the spoke core 6 abuts against the upper surface of the boss plate 8.

Therefore, the present examples and embodiments are to be considered as illustrative and not restrictive and the invention is not to be limited to the details given herein, but may be modified within the scope of the appended claims.

What is claimed is:

1. A steering wheel mounted on a steering shaft with a boss plate, the steering wheel having an air bag and a gripping ring for manually turning the steering shaft, wherein said steering wheel comprises:

a metal ring core embedded in said gripping ring;

a pair of connecting pieces made of aluminum alloy, wherein the pair of connecting pieces are located opposite to each other, and each connecting piece extends obliquely from the boss plate toward the gripping ring, a spoke core made of aluminum alloy and extending between said ring core and said connecting piece, wherein the spoke core has first parts and second parts, each first part being positioned parallel to a plane formed by the gripping ring and being connected to the metal ring core, each second part extending obliquely from a distal end of a corresponding one of the first parts toward and overlapping with a corresponding one of the connecting pieces;

a cover for covering the metal ring core and the first parts of the spoke core;

a pad integrally formed with the cover to be located at a substantially central location with respect to the gripping ring; and a holder for supporting the air bag, the holder having a pair of support arms, each support arm extending obliquely and overlapping with a corresponding one of the second parts of the spoke core;

wherein each support arm of the holder is located at an inner side of each second part of the spoke core, and wherein each connecting piece is located at an outer side of each second part of the spoke core; and a fastener for fastening each support arm, each second part of the spoke core and each connecting piece together, wherein said fastener includes a bolt and a nut engaged with the bolt, wherein said support arm, said second part of the spoke core and said connection piece each has a through hole for receiving the bolt, wherein the fastener further includes a reinforcing bolt insert made of an iron-based metal and embedded in the through hole of at least one of the second part of the spoke core and the associated connection piece, wherein the bolt passes through the associated bolt insert and the associated through hole to engage the nut.

2. The steering wheel according to claim 1 wherein said reinforcing bolt insert has a hole formed therein, the axis of which intersects the axis of said steering wheel.

3. The steering wheel according to claim 1 wherein said boss plate includes a boss formed integrally therewith and a shaft insert embedded therein, and wherein said steering shaft is inserted into and engaged with the shaft insert in a manner prohibiting relative rotation of the steering shaft with respect to the shaft insert.

4. The steering wheel according to claim 1, wherein said nut is fixed to the support arm.

* * * * *